(12) United States Patent
Alisawi

(10) Patent No.: US 10,250,513 B2
(45) Date of Patent: Apr. 2, 2019

(54) SYSTEMS AND METHODS FOR ENHANCING MOBILE TRAFFIC MANAGEMENT AT A PROXY SERVER ASSOCIATED WITH OR RESIDING ON A MOBILE CARRIER FOR ALIGNING TRAFFIC IN THE MOBILE NETWORK

(71) Applicant: Seven Networks, LLC, Marshall, TX (US)

(72) Inventor: Rami Alisawi, Kerava (FI)

(73) Assignee: Seven Networks, LLC, Marshall, TX (US)

( * ) Notice: Subject to any disclaimer, the term of this patent is extended or adjusted under 35 U.S.C. 154(b) by 57 days.

(21) Appl. No.: 14/050,211

(22) Filed: Oct. 9, 2013

(65) Prior Publication Data
US 2015/0023160 A1 Jan. 22, 2015

Related U.S. Application Data

(63) Continuation of application No. 14/049,105, filed on Oct. 8, 2013.
(Continued)

(51) Int. Cl.
*H04L 12/823* (2013.01)
*H04W 28/02* (2009.01)
*H04L 29/08* (2006.01)
*H04W 52/02* (2009.01)

(52) U.S. Cl.
CPC .............. *H04L 47/32* (2013.01); *H04L 67/28* (2013.01); *H04L 67/322* (2013.01);
(Continued)

(58) Field of Classification Search
None
See application file for complete search history.

(56) References Cited

U.S. PATENT DOCUMENTS 6,590,875 B1 * 7/2003 Niwa .............................. 370/328
7,092,399 B1 * 8/2006 Cheriton ....................... 370/401
(Continued)

FOREIGN PATENT DOCUMENTS

WO 2008147258 A1 12/2008
WO 2009070415 A1 6/2009
(Continued)

OTHER PUBLICATIONS

International Search Report dated Nov. 6, 2014 for PCT/US2014/047495.
(Continued)

*Primary Examiner* — Steven H Nguyen
(74) *Attorney, Agent, or Firm* — NK Patent Law

(57) ABSTRACT

Systems and methods for enhancing mobile traffic management at a proxy server or component associated with or residing on a mobile carrier or mobile operator side for aligning traffic in the mobile network are disclosed. The proxy server, in some embodiments, can align requests initiated by one or more third-party servers or application servers with a radio state of a mobile device to reduce a number of network connection. The proxy server can align the requests by delaying the requests such that the requests that were delayed can be transferred to the mobile device over a single connection between the mobile device and a mobile network.

15 Claims, 18 Drawing Sheets

Related U.S. Application Data

(60) Provisional application No. 61/857,175, filed on Jul. 22, 2013.

(52) U.S. Cl.
CPC ... *H04W 28/0221* (2013.01); *H04W 52/0229* (2013.01); *H04W 52/0254* (2013.01); *Y02D 70/1224* (2018.01); *Y02D 70/1242* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/21* (2018.01); *Y02D 70/23* (2018.01); *Y02D 70/26* (2018.01)

(56) References Cited

U.S. PATENT DOCUMENTS

| | | | |
|---|---|---|---|
| 7,366,093 B2* | 4/2008 | Alfano et al. | 370/229 |
| 7,587,510 B1 | 9/2009 | Klager et al. | |
| 7,752,330 B2* | 7/2010 | Olsen et al. | 709/232 |
| 8,391,142 B2* | 3/2013 | Blasinski et al. | 370/230 |
| 8,417,823 B2 | 4/2013 | Luna et al. | |
| 8,539,040 B2 | 9/2013 | Luna et al. | |
| 8,831,658 B2 | 9/2014 | Meylan et al. | |
| 8,943,204 B2 | 1/2015 | Caldeira de Andrada et al. | |
| 9,009,250 B2* | 4/2015 | Luna | 709/213 |
| 9,100,873 B2 | 8/2015 | Luna et al. | |
| 2002/0108121 A1 | 8/2002 | Alao et al. | |
| 2003/0046433 A1 | 3/2003 | Luzzatti et al. | |
| 2003/0148760 A1 | 8/2003 | Takayanagi | |
| 2004/0081088 A1 | 4/2004 | Schinner et al. | |
| 2004/0219940 A1 | 11/2004 | Kong et al. | |
| 2004/0259542 A1 | 12/2004 | Viitamaki et al. | |
| 2004/0264396 A1 | 12/2004 | Ginzburg et al. | |
| 2005/0136882 A1 | 6/2005 | Boulton | |
| 2005/0216844 A1 | 9/2005 | Error et al. | |
| 2006/0282408 A1 | 12/2006 | Wisely | |
| 2007/0111764 A1 | 5/2007 | Park | |
| 2008/0008095 A1 | 1/2008 | Gilfix | |
| 2008/0140794 A1 | 6/2008 | Rybak | |
| 2008/0207182 A1 | 8/2008 | Maharahjh | |
| 2008/0242370 A1 | 10/2008 | Lando et al. | |
| 2008/0278312 A1 | 11/2008 | Kristensson et al. | |
| 2008/0279212 A1 | 11/2008 | Tominaga | |
| 2009/0011791 A1 | 1/2009 | Tashiro | |
| 2009/0265752 A1 | 10/2009 | Sharif-Ahmadi et al. | |
| 2009/0275349 A1 | 11/2009 | Bae et al. | |
| 2010/0077035 A1 | 3/2010 | Li et al. | |
| 2010/0083255 A1 | 4/2010 | Bane et al. | |
| 2010/0093273 A1 | 4/2010 | Hohl | |
| 2010/0149975 A1 | 6/2010 | Tripathi | |
| 2010/0214942 A1 | 8/2010 | Du et al. | |
| 2010/0241312 A1 | 9/2010 | Preston et al. | |
| 2010/0250695 A1 | 9/2010 | Shenfield et al. | |
| 2010/0312946 A1 | 12/2010 | Bold et al. | |
| 2011/0045847 A1 | 2/2011 | Roin et al. | |
| 2011/0177847 A1 | 7/2011 | Huang | |
| 2011/0194539 A1* | 8/2011 | Blasinski et al. | 370/336 |
| 2011/0216681 A1 | 9/2011 | Tao et al. | |
| 2011/0255444 A1 | 10/2011 | Soliman et al. | |
| 2011/0299454 A1 | 12/2011 | Krishnaswamy | |
| 2012/0023190 A1* | 1/2012 | Backholm et al. | 709/217 |
| 2012/0023226 A1* | 1/2012 | Petersen et al. | 709/224 |
| 2012/0023236 A1* | 1/2012 | Backholm et al. | 709/226 |
| 2012/0026879 A1 | 2/2012 | Footiit | |
| 2012/0034922 A1 | 2/2012 | Jones | |
| 2012/0108225 A1* | 5/2012 | Luna et al. | 455/418 |
| 2012/0149352 A1* | 6/2012 | Backholm et al. | 455/418 |
| 2012/0295645 A1 | 11/2012 | Yariv | |
| 2012/0324041 A1 | 12/2012 | Gerber | |
| 2013/0007119 A1* | 1/2013 | Zarka et al. | 709/203 |
| 2013/0012180 A1 | 1/2013 | Backholm | |
| 2013/0031600 A1* | 1/2013 | Luna et al. | 726/1 |
| 2013/0031601 A1* | 1/2013 | Bott | 726/1 |
| 2013/0044702 A1 | 2/2013 | Jayaraman et al. | |
| 2013/0159511 A1* | 6/2013 | Backholm et al. | 709/224 |
| 2013/0163431 A1* | 6/2013 | Backholm et al. | 370/235 |
| 2013/0163740 A1 | 6/2013 | T. et al. | |
| 2013/0170507 A1 | 7/2013 | Hsueh et al. | |
| 2013/0188543 A1 | 7/2013 | Dwyer et al. | |
| 2013/0190032 A1* | 7/2013 | Li | 455/517 |
| 2013/0191544 A1 | 7/2013 | Caldeira de Andrada et al. | |
| 2013/0203433 A1* | 8/2013 | Luna et al. | 455/452.1 |
| 2013/0294307 A1 | 11/2013 | Johansson et al. | |
| 2014/0051485 A1 | 2/2014 | Wang et al. | |
| 2014/0153460 A1 | 6/2014 | Shrivastava et al. | |
| 2014/0226562 A1 | 8/2014 | Shah et al. | |
| 2015/0131453 A1 | 5/2015 | Tofighbakhsh et al. | |

FOREIGN PATENT DOCUMENTS

| | | |
|---|---|---|
| WO | 2012142884 A1 | 10/2012 |
| WO | 2013049060 A1 | 4/2013 |
| WO | 2013088186 A1 | 6/2013 |
| WO | 2013187658 A1 | 12/2013 |

OTHER PUBLICATIONS

Final Office Action dated Mar. 11, 2015 for U.S. Appl. No. 13618371.
Non-Final Office Action dated Mar. 4, 2014 for U.S. Appl. No. 14499232.
Combined Search and Examination Report for GB Application No. GB1317972.6 dated Dec. 9, 2013.
Combined Search and Examination Report for GB Application No. GB1317828.0 dated Jan. 3, 2014.
Non-Final Office Action dated Apr. 27, 2015 for U.S. Appl. No. 14/050,211.
Final Office Action dated May 13, 2015 for U.S. Appl. No. 13/407,406.
Non-Final Office Action dated May 1, 2015 for U.S. Appl. No. 12/080,142.
Final rejection for U.S. Appl. No. 14/499,232 dated Jun. 26, 2015 and Notice of References Cited.
Final rejection for U.S. Appl. No. 13/477,625 dated Aug. 20, 2015 and Notice of References Cited.
Final Rejection dated Aug. 20, 2015 for U.S. Appl. No. 13/477,625.
Non-final rejection for U.S. Appl. No. 13/407,406 dated Sep. 9, 2015 and Notice of References cited.
USPTO, Non-Final Rejection for U.S. Appl. No. 14/551,107, dated Feb. 4, 2016.
USPTO, Final Rejection for U.S. Appl. No. 14/872,009, dated Apr. 15, 2016.
USPTO, Non-Final Rejection for U.S. Appl. No. 13/477,625, dated Mar. 23, 2016.
USPTO, Notice of Allowance for U.S. Appl. No. 14/467,881, dated Apr. 11, 2016.
USPTO, Notice of Allowance for U.S. Appl. No. 13/351,176, dated Mar. 25, 2016.
USPTO, corrected Notice of Allowance for U.S. Appl. No. 13/351,176, dated Apr. 13, 2016.
USPTO, Non-Final Rejection for U.S. Appl. No. 14/872,009, dated Jan. 13, 2016.
USPTO, Final Rejection for U.S. Appl. No. 14/745,796, dated Sep. 21, 2016.
USPTO, Notice of Allowance for U.S. Appl. No. 15/077,370, dated Sep. 14, 2016.
CIPO, Commissioner's Decision for Canadian Patent Application No. 2,806,527, dated Jul. 20, 2016.
InnovationQ—IP.com: Search results of "Optimizing mobile network traffic across multiple . . . ", Sep. 2, 2016, https://iq.ip.com/discover.
IEEE Xplore Search Results: Search results of "Optimizing mobile network traffic across multiple application to save power on the battery and refined by", Sep. 2, 2016, http://ieeexplore.ieee.org/search.
Final rejection for U.S. Appl. No. 14/494,526 dated Nov. 13, 2015.

\* cited by examiner

| Traffic Category/Application Category 600 ||
|---|---|
| Interactive traffic | Background traffic |
| User waiting for response | User not waiting for response |
| Application in foreground | Application in background |
| Backlight on | Backlight off |

*FIG. 6*

| Content Category 700 ||
|---|---|
| High priority | Low priority |
| Time critical | Non-time critical |

*FIG. 7*

SYSTEMS AND METHODS FOR ENHANCING MOBILE TRAFFIC MANAGEMENT AT A PROXY SERVER ASSOCIATED WITH OR RESIDING ON A MOBILE CARRIER FOR ALIGNING TRAFFIC IN THE MOBILE NETWORK

CROSS-REFERENCE TO RELATED APPLICATION

The present application is continuation of U.S. patent application Ser. No. 14/049,105 titled "A Proxy Server Associated with a Mobile Carrier for Enhancing Mobile Traffic Management in a Mobile Network", filed on Oct. 8, 2013, which in turn claims priority to and benefit from U.S. Provisional Patent Application Ser. No. 61/857,175 titled "a. Proxy Server Associated with a Mobile Carrier for Enhancing Mobile Traffic Management in a Mobile Network", filed on Jul. 22, 2013, and is related to U.S. patent application Ser. No. 13/844,682 titled "Management of Mobile Device Radio State Promotion and Demotion", filed on Mar. 15, 2013 and U.S. patent application Ser. No. 14/147,434, filed on Jan. 3, 2014 and titled "Modifying System Timers for Optimizing Mobile Traffic Management" The entire content of the aforementioned applications is hereby incorporated by reference in their entirety.

BACKGROUND

Servers such as application servers and content providers periodically use push technology to request or transfer information to applications on the mobile devices. These server pushes from various application servers can result in a large number of network connections, with only a small amount of data being sent per connection session. Such behavior in a mobile network loads the mobile network with the extra signaling, resulting in mobile network congestion and degradation of the performance of mobile data sessions. Furthermore, a radio on a mobile device typically prefers to remain in an idle state to preserve power. Each time a server pushes data to the mobile device, the radio on the mobile device has to transition from the idle state to a connected state, and back down to the idle state following completion of data transfer. The frequent radio state transitions associated with a large number of network connections drains battery life in the mobile devices.

BRIEF DESCRIPTION OF THE DRAWINGS

FIG. 6 illustrates a table showing examples of different traffic or application category types which can be used for enhancing mobile traffic management.

FIG. 7 depicts a table showing examples of different content category types which can be used enhancing mobile traffic management.

DETAILED DESCRIPTION

Figure 1A:
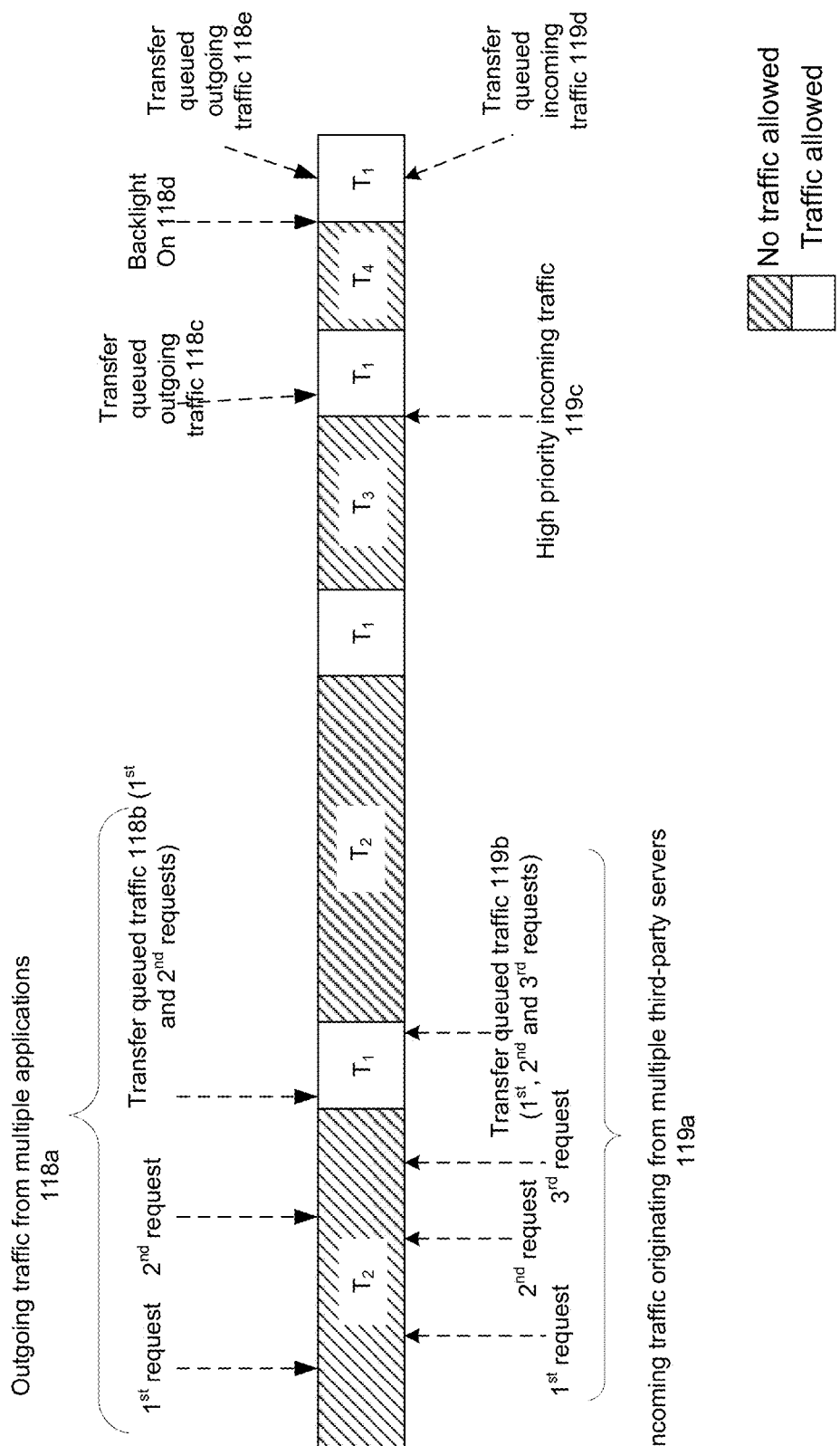
FIG. 1A depicts an example timing diagram for aligning outgoing and incoming traffic by a distributed proxy and cache system for enhancing mobile traffic management and resource conservation in a mobile network.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but are not necessarily, references to the same embodiment, and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

As used herein, a "module," "a manager," a "handler," a "detector," an "interface," a "controller," a "normalizer," a "generator," an "invalidator," a "categorizer" or an "engine" includes a general purpose, dedicated or shared processor and, typically, firmware or software modules that are executed by the processor. Depending upon implementation-specific or other considerations, the module, manager, handler, detector, interface, controller, normalizer, generator, invalidator, categorizer or engine can be centralized or its functionality distributed. The module, manager, handler, detector, interface, controller, normalizer, generator, invalidator, or engine can include general or special purpose hardware, firmware, or software embodied in a computer-readable (storage) medium for execution by the processor.

As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

Without intent to limit the scope of the disclosure, examples of instruments, apparatus, methods and their related results according to the embodiments of the present disclosure, are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Mobile Traffic Management

Many applications receive notifications or requests initiated by application servers ("push mechanism"). The application servers or push servers then periodically push new/updated data to mobile devices. Embodiments of the present disclosure include a proxy server associated with or residing on a mobile carrier or a mobile operator network for managing (e.g., aligning) incoming traffic initiated by application servers for enhancing mobile traffic management in a mobile network. As used herein, incoming traffic includes traffic initiated by one or more application servers associated with one or more mobile applications on a mobile device. By way of example, incoming traffic can include VIBER, WHATSAPP, LINE and other application messages initiated from the server side, i.e., from the application servers.

As used herein, a network-side proxy is a proxy server associated with or residing on a mobile carrier or a mobile operator network. In some embodiments, the network-side proxy may reside in a mobile operator or carrier's core network or the radio access network. In other embodiments, the network-side proxy may be coupled to or be a component of a mobile operator server or other infrastructure. The network-side proxy can be aware of the radio state of the mobile devices to radio-align incoming traffic to optimize network initiated radio connections and thereby enhance mobile traffic management and resource conservation in a mobile network. In some other embodiments, the network-side proxy manages server responses (e.g., responses to requests initiated from mobile devices and thus different from incoming traffic) from application servers that are delayed beyond the radio dormancy timeouts to optimize the number of radio connections caused by such delayed responses. For example, in some operator settings, the inactivity timer or radio dormancy timeout is as short as 3 seconds. If an HTTP response from an application server comes back in 4 seconds, after the radio on the mobile device is demoted to an idle state, the HTTP response can cause the radio to be promoted back to a connected or active state. The network-side proxy can intercept and accumulate such response traffic from application servers and transfer them when the radio on the mobile device is active. The interception can be selective, so that response traffic which is critical or high priority can cause immediate radio promotion on the mobile device. In yet other embodiments, the network-side proxy manages incoming traffic initiated by application servers, such as messages from VIBER, WHATSAPP, LINE, and the like, using one or more alignment techniques. Example techniques for aligning requests include, but are not limited to, delaying, clumping (also referred to as gating or bundling), blocking or restricting, prioritizing, filtering and the like.

Many applications initiate application requests from the mobile device side to request updates ("pull mechanism"). Embodiments of the present disclosure include a local proxy on a mobile device that provides a client-side traffic management solution for managing application requests initiated from the mobile device. The local proxy can, for example, batch or align outgoing traffic originating from one or more applications so that fewer connection attempts are made from the client side, resulting in fewer radio state transitions (e.g., transition from idle to connected state or vice versa, transition from low power to high power state or vice versa) and thereby enhancing mobile traffic management and resource conservation in a mobile network. As used herein, outgoing traffic includes traffic initiated from a mobile device. By way of example, outgoing traffic can include requests (user initiated or background requests) from mobile applications on a mobile device, transport or transmission protocol messages (e.g., SYN, ACK, FIN, RST), and the like.

Embodiments of the present disclosure also include a distributed proxy and cache system including a network-side proxy associated with a mobile operator, a local proxy on a mobile device and/or a proxy server associated with a host server and methods for enhancing management of incoming and outgoing traffic to reduce signaling and conserve resources in a mobile network. With the client-side traffic management solution for pull requests and the network-side (i.e., at the network-side proxy) traffic management solution for push requests, the disclosed technology provides an intelligent traffic management solution for reducing signaling in the mobile network and conserving battery and network resources.

In some embodiments of the distributed proxy and cache system, the network-side proxy and the local proxy agree on an interval, and delay incoming traffic (at the network-side proxy) and outgoing traffic (at the local proxy) to match that interval. In other embodiments of the distributed proxy and cache system, the local proxy, via a one way radio-aware control channel between the local proxy and the network-side proxy, provides information concerning the mobile device, applications, and/or user behavior or activity that can be utilized by the network-side proxy to align, delay, clump, block or otherwise manage incoming traffic to optimize radio connections initiated from activities of application servers and thereby enhance mobile traffic management and resource conservation in a mobile network. In yet other embodiments of the distributed proxy and cache system, the network-side proxy uses caching strategy to provide cached responses to third-party server requests to further optimize network initiated radio connections and thereby enhance mobile traffic management and resource conservation in a mobile network. In some embodiments of the distributed proxy and cache system including a network-side proxy, a local proxy and/or a server-side proxy, incoming and outgoing traffic can be managed based on traffic management policies to optimize radio connections initiated from activities of application servers and thereby enhance mobile traffic management and resource conservation in a mobile network.

Certain embodiments of the disclosed technology includes, for example, alignment of requests from multiple applications to minimize the need for several polling requests, leverage specific content types to determine how to proxy/manage a connection/content, and application of specific heuristics associated with device, user behavioral patterns (how often they interact with the device/application) and/or network parameters to intelligently manage traffic at the device level.

Certain disclosed embodiments can further include, moving recurring Hypertext Transfer Protocol (HTTP) polls performed by various widgets, RSS readers, etc., to remote network node (e.g., Network Operation Center (NOC)), thus considerably lowering device battery/power consumption, radio channel signaling and bandwidth usage. Additionally, the offloading can be performed transparently so that existing applications do not need to be changed.

In some embodiments, this can be implemented using a local proxy on the mobile device (e.g., any wireless device) which automatically detects recurring requests for the same content (RSS feed, Widget data set) that matches a specific rule (e.g., happens every 15 minutes). The local proxy can automatically cache the content on the mobile device while delegating the polling to the server (e.g., a proxy server operated as an element of a communications network). The server can then notify the mobile/client proxy if the content changes, and if content has not changed (or not changed sufficiently, or in an identified manner or amount) the mobile proxy provides the latest version in its cache to the user (without need to utilize the radio at all). This way the mobile or wireless device (e.g., a mobile phone, smart phone, M2M module/MODEM, or any other wireless devices, etc.) does not need to open (e.g., thus powering on the radio) or use a data connection if the request is for content that is monitored and that has been not flagged as new/changed.

The logic for automatically adding content sources/application servers (e.g., including URLs/content) to be monitored can also check for various factors like how often the content is the same, how often the same request is made (is there a fixed interval/pattern?), which application is requesting the data, etc. Similar rules to decide between using the cache and request the data from the original source may also be implemented and executed by the local proxy and/or server in certain embodiments.

For example, when the request comes at an unscheduled/unexpected time (user initiated check), or after every (n) consecutive times the response has been provided from the cache, etc., or if the application is running in the background vs. in a more interactive mode of the foreground. As more and more mobile applications or wireless enabled applications base their features on resources available in the network, this becomes increasingly important. In addition, the disclosed technology allows elimination of unnecessary chatter from the network, benefiting the operators trying to optimize the wireless spectrum usage.

Traffic Categorization and Policy

In some embodiments, the disclosed proxy system is able to establish policies for choosing traffic (data, content, messages, updates, etc.) to cache and/or shape. Additionally, by combining information from observing the application making the network requests, getting explicit information from the application, or knowing the network destination the application is reaching, the disclosed technology can determine or infer what category the transmitted traffic belongs to.

For example, in some embodiments, mobile or wireless traffic can be categorized as: (a1) interactive traffic or (a2) background traffic. The difference is that in (a1) a user is actively waiting for a response, while in (a2) a user is not expecting a response. This categorization can be used in conjunction with or in lieu of a second type of categorization of traffic: (b1) immediate, (b2) low priority, (b3) immediate if the requesting application is in the foreground and active.

For example, a new update, message or email may be in the (b1) category to be delivered immediately, but it still is (a2) background traffic—a user is not actively waiting for it. A similar categorization applies to instant messages when they come outside of an active chat session. During an active chat session a user is expecting a response faster. Such user expectations are determined or inferred and factored into when optimizing network use and device resources in performing traffic categorization and policy implementation.

Some examples of the applications of the described categorization scheme include the following: (a1) interactive traffic can be categorized as (b1) immediate but (a2) background traffic may also be (b2) or (b3). An example of a low priority transfer is email or message maintenance transaction such as deleting email or other messages or marking email as read at the mail or application server. Such a transfer can typically occur at the earlier of (a) timer exceeding a timeout value (for example, 2 minutes), and (b) data being sent for other purposes.

Examples example of (b3) are IM presence updates, stock ticker updates, weather updates, status updates and news feeds. When the UI of the application is in the foreground and/or active (for example, as indicated by the backlight of the device/phone being lit or as determined or inferred from the status of other sensors), updates can be considered immediate whenever the server has something to push to the device. When the application is not in the foreground or not active, such updates can be suppressed until the application comes to foreground and is active.

With some embodiments, networks can be selected or optimized simultaneously for (a1) interactive traffic and (a2) background traffic.

In some embodiments, as the wireless device or mobile device proxy (separately or in conjunction with the server proxy and/or the network-side proxy) is able to categorize the traffic as (for example) (a1) interactive traffic or (a2) background traffic, it can apply different policies to different types of traffic. This means that it can internally operate differently for (a1) and (a2) traffic (for example, by allowing interactive traffic to go through to the network or the mobile device in whole or in part, and apply stricter traffic control to background traffic or the device side only allows a request to activate the radio if it has received information from the server that the content at the host has been updated, etc.).

When the request does require access over the wireless network, the disclosed technology can request the radio layer to apply different network configurations to different traffic. Depending on the type of traffic and network, this may be achieved by different means:

(1) Using 3G/4G for (a1) and 2G/2.5G for (a2);
(2) Explicitly specifying network configuration for different data rates (e.g. in terms of use of FACH (forward access channel) vs. DCH (dedicated channel), or otherwise requesting lower/more network efficient data rates for background traffic); or
(3) Utilizing different network access points for different data rates (access points which would be configured to use network resources differently similar to (1) and (2) above).

Additionally, 3GPP Fast Dormancy calls for improvements so that applications, operating systems or the mobile device would have awareness of the traffic type to be more efficient in the future. Certain embodiments of the disclosed system, having the knowledge of the traffic category and being able to utilize Fast Dormancy appropriately may solve the problem identified in Fast Dormancy. In this manner, the mobile or broadband network does not need to be configured with a compromised configuration that adversely impacts both battery consumption and network signaling resources.

Polling Schedule

Detecting (or determining) a polling schedule allows the proxy server (server-side of the distributed cache system) to be as close as possible with its polls to the application polls. Many applications employ scheduled interval polling (e.g., every 4 hours or every 30 seconds, at another time interval). The client side proxy can detect automatic polls based on time measurements and create an automatic polling profile for an application. As an example, the local proxy attempts to detect the time interval between requests and after 2, 3, 4, or more polls, determines an automatic rate if the time intervals are all within 1 second (or another measure of relative closeness) of each other. If not, the client may collect data from a greater number of polling events (e.g., 10-12 polls) and apply a statistical analysis to determine, compute, or estimate a value for the average interval that is used. The polling profile is delivered to the server where it is used. If it is a frequent manual request, the locally proxy can substitute it with a default interval for this application taken from a profile for non-critical applications.

In some embodiments, the local proxy (e.g., device side proxy) may keep monitoring the application/client polls and update the polling interval. If it changes by more than 30% (or another predetermined/dynamic/conditional value) from the current value, it is communicated to the proxy server (e.g., server-side proxy). This approach can be referred to as the scenario of "lost interest." In some instances, the local proxy can recognize requests made outside of this schedule, consider them "manual," and treat them accordingly.

Application Classes/Modes of Caching

In some embodiments, applications can be organized into three groups or modes of caching. Each mobile client/application can be categorized to be treated as one of these modes, or treated using multiple modes, depending on one or more conditions.

A) Fully cached—local proxy updates (e.g., sends application requests directly over the network to be serviced by the application server/content host) only when the proxy server tells the local proxy to update. In this mode, the local proxy can ignore manual requests and the proxy server uses the detected automatic profile (e.g., sports score applets, Facebook, every 10, 15, 30, or more polls) to poll the application server/content provider.

B) Partially cached—the local proxy uses the local or internal cache for automatic requests (e.g., application automatic refreshes), other scheduled requests but passes through some manual requests (e.g., email download, EBay or some Facebook requests); and C) Never cached (e.g., real-time stock ticker, sports scores/statuses; however, in some instances, 15 minutes delayed quotes can be safely placed on 30 seconds schedules—B or even A).

The actual application or caching mode classification can be determined based on the rate of content change and critical character of data. Unclassified applications by default can be set as class C.

Backlight and Active Applications

In some embodiments, the local proxy detects the device backlight status. Requests made with the screen light 'off' can be allowed to use the local cache if a request with identical signature is registered with the proxy server, which is polling the original host server/content server(s) to which the requests are directed. If the screen light is 'on', further detection can be made to determine whether it is a background application or for other indicators that local cache entries can or cannot be used to satisfy the request. When identified, the requests for which local entries can be used may be processed identically to the screen light off situation. Foreground requests can use the aforementioned application classification to assess when cached data is safe to use to process requests. In some embodiments, backlight and active application status information relating to a mobile device can be passed on to a network-side proxy to allow the network-side proxy to utilize such information in managing traffic directed towards the mobile device. For example, along with outgoing traffic, the local proxy can include an indication relating to screen on/off status, presence or absence of user activity, an indication of application which is currently being used by a user, and the like. Based on such information, the network-side proxy can adjust its alignment strategy. For example, if the screen is off, the network-side proxy can increase the interval for delaying incoming traffic.

FIG. 1A depicts an example timing diagram for aligning outgoing and incoming traffic by a distributed proxy and cache system for enhancing mobile traffic management and resource conservation in a mobile network.

In the embodiment illustrated, a local proxy (e.g. local proxy 175 in FIGS. 1C-1E and FIG. 2A) on a mobile device (e.g., mobile device 150 in FIG. 1C) and a network-side proxy (e.g., network-side proxy 114 in FIGS. 1C-1E and FIG. 3) in, of or otherwise associated with an operator network (e.g., the core network or the radio access network) agree on or determine an interval (e.g., time period T1) during which incoming and outgoing traffic are allowed to or from the mobile device. During the rest of the time (e.g., time period T2, T3 and T4), any incoming traffic 119a are intercepted and accumulated at the network-side proxy and any outgoing traffic 118a are intercepted and accumulated at the local proxy. In some embodiments, the outgoing traffic includes background traffic, such as application requests initiated while the mobile device is in the background mode (i.e., mobile device is not being actively used by the user), requests associated with native applications, operating system operations, and the like. Many applications (e.g., mobile applications) such as social networking applications, news applications, weather applications, chat applications, gaming applications, and the like periodically initiate data sessions on their own, even when the mobile device is not being actively used by the user or even in the foreground. The requests from such data sessions are examples of background requests.

Figure 1B:
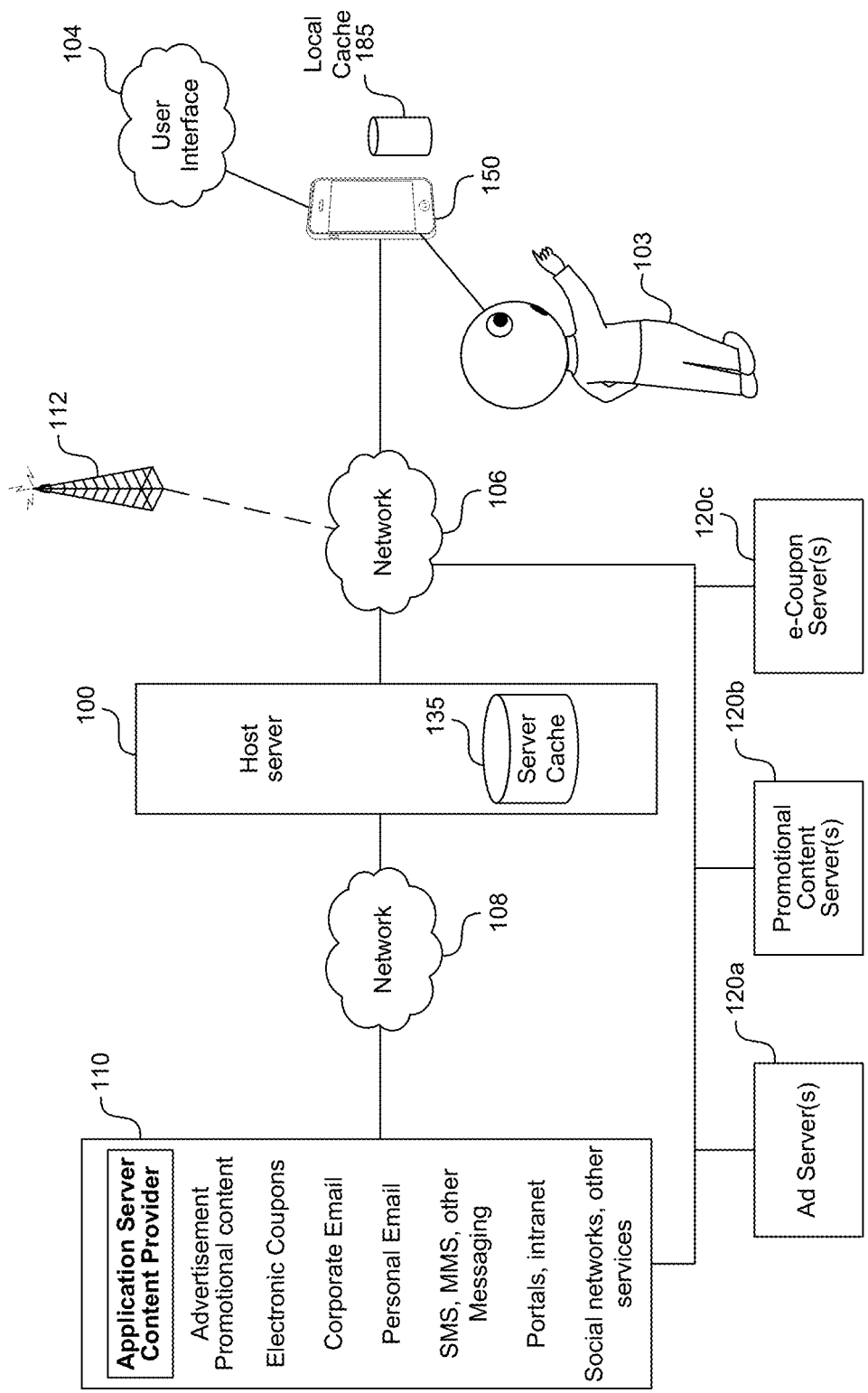
FIG. 1B illustrates an example diagram of a system where a host server facilitates management of traffic, content caching, and/or resource conservation between mobile devices (e.g., wireless devices), an application server or content provider, or other servers such as an ad server, promotional content server, or an e-coupon server in a wireless network (or broadband network) for a distributed proxy system for enhancing mobile traffic management and resource conservation in the mobile network.
Figure 1C:
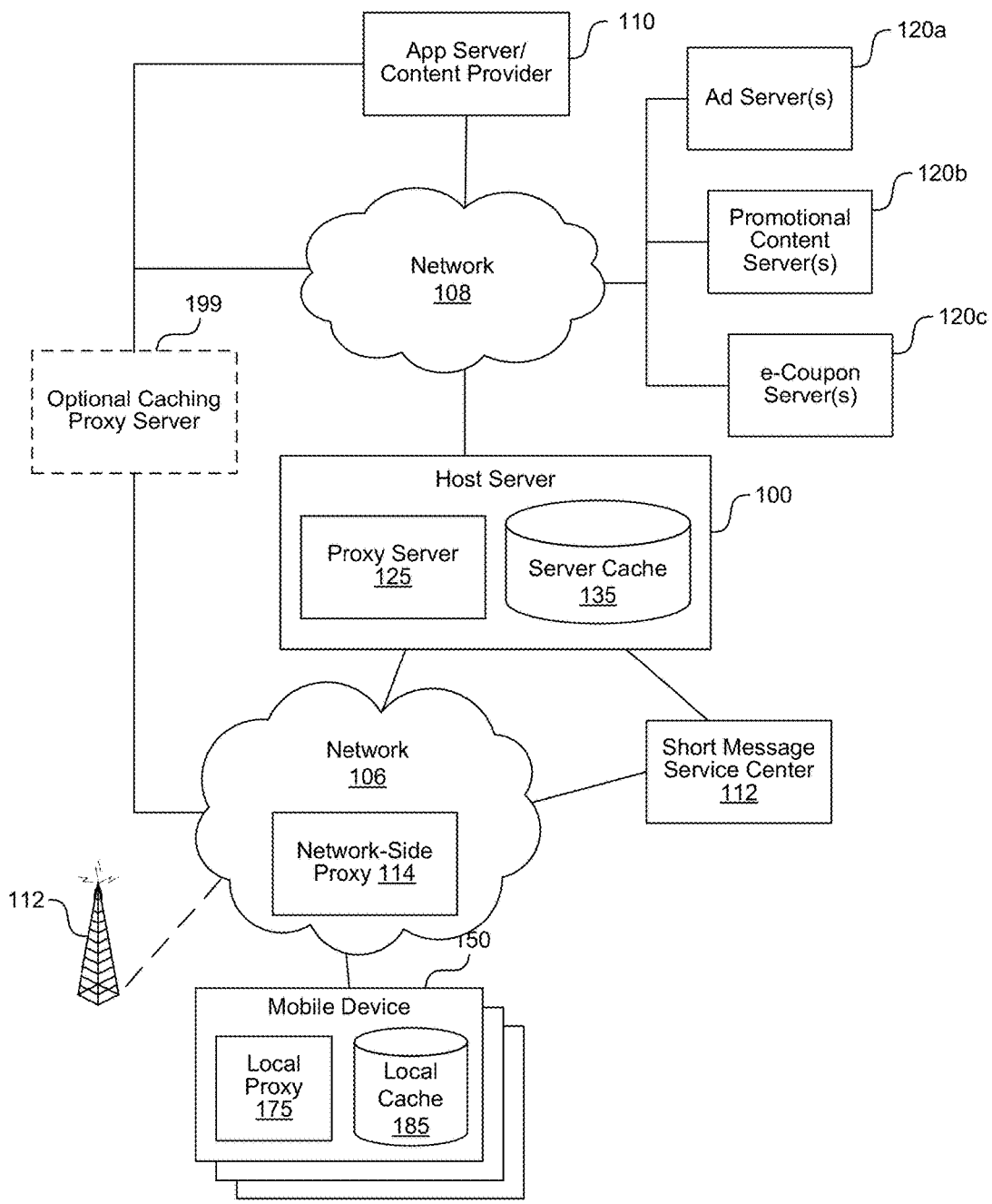
FIG. 1C illustrates an example diagram of a proxy and cache system distributed between the host server, operator network and a mobile device which facilitates network traffic management between the mobile device, an application server or content provider, or other servers such as an ad server, promotional content server, or an e-coupon server for traffic management, resource conservation and content caching. The network-side proxy in the operator network can further enhance mobile traffic management and resource conservation in a mobile network.

Some incoming traffic can include traffic initiated on the server-side by third party servers (e.g., application servers/content providers 110, ad server(s) 120a, promotional content server(s) 120b and e-coupon servers 120c in FIG. 1B and FIG. 1C). Note that a third-party server and an application server is used interchangeably throughout the disclosure. Examples of incoming traffic can include VIBER, WHATSAPP, LINE, and other push-type application messages pushed to the mobile device. In some implementations, the incoming traffic excludes traffic such as HTTP responses to HTTP requests from the device-side, which are not server-initiated traffic but nevertheless can cause radio state promotion (e.g., promotion from idle state to connected state, promotion from low power state to high power state). This usually occurs when the inactivity timer, network dormancy timer or radio dormancy timer in the operator settings is set to a low value (e.g., 3 seconds). When a server response arrives after the inactivity timer has expired (e.g., after 4 seconds) and after the radio state is demoted to an idle state, the server response can cause the radio on the mobile device to be promoted to a connected state again.

As illustrated, during time period $T_2$, a number of data requests from one or more mobile applications are queued. The queued traffic 118b is then subsequently transferred to their respective destinations during time period $T_1$, after the radio is powered on. During the same time period $T_2$, at the network-side proxy, server initiated requests are queued, and the queued traffic 119b is sent to the mobile device during the interval $T_1$ when the radio is powered on.

In some instances, some of the incoming or outgoing traffic may be of high priority or may be time critical. For example, FIG. 1A illustrates a high priority incoming traffic 119c arriving at the network-side proxy (e.g., network-side proxy 114 in FIGS. 1C-1E and FIG. 3). In such a case, the network-side proxy can cause the radio on the mobile device to power on, go up, get activated, get promoted or otherwise change to a different power state (e.g., a higher power or lower power state) after time period $T_3$, where the time period $T_3$ is shorter than $T_2$. The high priority incoming traffic 119c can then be transferred to the mobile device without delay. Since the radio is powered on, the local proxy on the mobile device can use the opportunity to transfer any queued outgoing traffic 118c during the interval T1. When the transfer is complete, the radio is powered down.

In some other instances, a change in the device state can occur (e.g., backlight turns on 118d), which can cause the radio on the mobile device to go up after time period $T_4$ where the time period $T_4$ is shorter than $T_2$. When the change in the radio state is detected, the local proxy can transfer any queued outgoing traffic 118e to their respective destinations, and the network-side proxy can similarly transfer any queued incoming traffic 119d to the mobile device.

It should be noted that the time periods T1-T4 are shown for illustrative purposes only. These time periods may be configurable by the network operator or the network-side proxy (e.g., network-side proxy 114 in FIGS. 1C-1E and FIG. 3), the local proxy (e.g., local or client-side proxy 175 in FIGS. 1C-1E and FIG. 2A, and/or the proxy server (e.g., proxy server 125 in FIGS. 1C-1E and FIG. 4A). For example, the proxy server can deploy a policy which specifies the length of the interval for allowing incoming and outgoing traffic, length of the interval for delaying incoming and outgoing traffic, conditions under which certain types of traffic can be allowed, and the like. These time periods may also be changed on the fly, either on demand or based on one or more criteria such as screen on/off state, user activity, application foreground/background state, power level, and the like.

FIG. 1B illustrates an example diagram of a system where a host server 100 facilitates management of traffic, content caching, and/or resource conservation between client devices 150 (e.g., mobile devices or wireless devices), an application server 110 or content provider, or other servers such as an ad server 120a, promotional content server 120b, or an e-coupon server 120c in a wireless network (or broadband network) for a distributed proxy system for enhancing mobile traffic management in the mobile network and resource conservation.

The client devices 150 can be any system and/or device, and/or any combination of devices/systems that is able to establish a connection, including wired, wireless, cellular connections with another device, a base station 112, a server and/or other systems such as host server 100 and/or application server/content provider 110. Client devices 150 will typically include a display and/or other output functionalities to present information and data exchanged among the client devices 150 and/or the host server 100 and/or application server/content provider 110. The application server/content provider 110 can by any server including third party servers or service/content providers further including advertisement, promotional content, publication, or electronic coupon servers or services. Similarly, separate advertisement servers 120*a*, promotional content servers 120*b*, and/or e-Coupon servers 120*c* as application servers or content providers are illustrated by way of example.

The client devices 150 can include, for example, mobile, hand held or portable devices, wireless devices, or non-portable devices and can be any of, but not limited to, a server desktop, a desktop computer, a computer cluster, or portable devices including a notebook, a laptop computer, a handheld computer, a palmtop computer, a mobile phone, a cell phone, a smart phone, a PDA, a Blackberry device, a Palm device, any tablet, a phablet (a class of smart phones with larger screen sizes between a typical smart phone and a tablet), a handheld tablet (e.g., an iPad, the Galaxy series, the Nexus, the Kindles, Kindle Fires, any Android-based tablets, Windows-based tablets, or any other tablet), any portable readers/reading devices, a hand held console, a hand held gaming device or console, a head mounted device, a head mounted display, a thin client or any SuperPhone such as the iPhone, and/or any other portable, mobile, hand held devices, or fixed wireless interface such as a M2M device, wearable devices, mobile-enabled electronic glasses, mobile-enabled electronic watches, wireless-enabled glasses, wireless-enabled watches, wireless electronic glasses, wireless electronic watches, etc. In one embodiment, the client devices 150 (or mobile devices 150), host server 100, and application server 110 are coupled via a network 106 and/or a network 108. In some embodiments, the devices 150 and host server 100 may be directly connected to one another.

The input mechanism on client devices 150 can include touch screen keypad (including single touch, multi-touch, gesture sensing in 2D or 3D, etc.), a physical keypad, a mouse, a pointer, a track pad, a stylus, a stylus detector/sensor/receptor, motion detector/sensor (e.g., including 1-axis, 2-axis, 3-axis accelerometer, etc.), a face detector/recognizer, a retinal detector/scanner, a light sensor, capacitance sensor, resistance sensor, temperature sensor, proximity sensor, a piezoelectric device, device orientation detector (e.g., electronic compass, tilt sensor, rotation sensor, gyroscope, accelerometer), or any combination of the above.

Signals received or detected indicating user activity at client devices 150 through one or more of the above input mechanism, or others, can be used in the disclosed technology in acquiring context awareness at the client device 150. Context awareness at client devices 150 generally includes, by way of example but not limitation, client device 150 operation or state acknowledgement, management, user activity/behavior/interaction awareness, detection, sensing, tracking, trending, and/or application (e.g., mobile applications) type, behavior, activity, operating state, etc.

Context awareness in the present disclosure also includes knowledge and detection of network side contextual data and can include network information such as network capacity, bandwidth, traffic, type of network/connectivity, and/or any other operational state data. Network side contextual data can be received from and/or queried from network service providers (e.g., cell provider 112 and/or Internet service providers) of the network 106 and/or network 108 (e.g., by the host server and/or devices 150). In addition to application context awareness as determined from the client 150 side, the application context awareness may also be received from or obtained/queried from the respective application/service providers 110 (by the host 100 and/or client devices 150).

The host server 100 can use, for example, contextual information obtained for client devices 150, networks 106/108, applications (e.g., mobile applications), application server/provider 110, or any combination of the above, to manage the traffic in the system to satisfy data needs of the client devices 150 (e.g., to satisfy application or any other request including HTTP request). In one embodiment, the traffic is managed by the host server 100 to satisfy data requests made in response to explicit or non-explicit user 103 requests and/or device/application maintenance tasks. The traffic can be managed such that network consumption, for example, use of the cellular network is conserved for effective and efficient bandwidth utilization. In addition, the host server 100 can manage and coordinate such traffic in the system such that use of device 150 side resources (e.g., including but not limited to battery power consumption, radio use, processor/memory use) are optimized with a general philosophy for resource conservation while still optimizing performance and user experience. The host server 100 may also indirectly manage traffic via creation, selection and/or deployment of traffic blocking policy for implementation on the mobile device in some embodiments.

For example, in context of battery conservation, the mobile device 150 can observe user activity (for example, by observing user keystrokes, backlight status, or other signals via one or more input mechanisms, etc.) and alter mobile device 150 behaviors. The mobile device 150 can also request the host server 100 to alter the behavior for network resource consumption based on user activity or behavior.

In one embodiment, traffic management for resource conservation is performed using a system distributed between the client device 150 and the network 106/108. The distributed system can include proxy and cache components on the client device 150 side, and the network side 106/108.

In another embodiment, the traffic management for resource conservation is performed using a system distributed between the host server 100 and the client device 150. The distributed system can include a proxy server and cache components on the server side 100 and a local proxy and cache components on the device/client side, for example, as shown by the server cache 135 on the server 100 side and the local cache 185 on the client device 150 side.

In yet another embodiment, the traffic management for resource conservation is performed using a system distributed among the host server 100, client device 150 and the network 106/108. The distributed system can include proxy and/or cache components on the server side 100, on the client device 150 side and on the network-side 106/108.

Functions and techniques disclosed for context aware traffic management for resource conservation in networks (e.g., network 106 and/or 108) and devices 150, reside in a distributed proxy and cache system. The proxy and cache system can be distributed between, and reside on, a given client device 150 in part or in whole, the host server 100 in part or in whole and/or the network-side proxy in part or in whole. The distributed proxy and cache system are illustrated with further reference to the example diagram shown in FIG. 1C. Functions and techniques performed by the proxy and cache components in the client device 150 and related components therein are described, respectively, in detail with further reference to the examples of FIGS. 2A-2B. Similarly, functions and techniques performed by the proxy and/or cache components in the network 106 and related components therein are described, respectively, in detail with further reference to the examples of FIG. 3. Functions and techniques performed by the proxy server and cache components in the host server 100 and related components are described in detail in the examples of FIGS. 4A-4C.

In one embodiment, client devices 150 communicate with the host server 100 and/or the application server 110 over network 106, which can be a cellular network and/or a broadband network. To facilitate overall traffic management between devices 150 and various application servers/content providers 110 to implement network (bandwidth utilization) and device resource (e.g., battery consumption), the host server 100 can communicate with the application server/providers 110 over the network 108, which can include the Internet (e.g., a broadband network).

In general, the networks 106 and/or 108, over which the client devices 150, the host server 100, and/or application server 110 communicate, may be a cellular network, a broadband network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, UDP, HTTP, DNS, FTP, UPnP, NSF, ISDN, PDH, RS-232, SDH, SONET, etc.

The networks 106 and/or 108 include any collection of distinct networks operating wholly or partially in conjunction to provide connectivity to the client devices 150 and the host server 100 and may appear as one or more networks to the serviced systems and devices. In one embodiment, communications to and from the client devices 150 can be achieved by, an open network, such as the Internet, or a private network, broadband network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), or any broadband network, and further enabled with technologies such as, by way of example, Global System for Mobile Communications (GSM), Personal Communications Service (PCS), Bluetooth, WiFi, Fixed Wireless Data, 2G, 2.5G, 3G (e.g., WCDMA/UMTS based 3G networks), 4G, IMT-Advanced, pre-4G, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, HSPA+, UMTS-TDD, 1×RTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks, broadband networks, or messaging protocols.

FIG. 1C illustrates an example diagram of a proxy and cache system distributed between the host server 100, operator network 106 and a mobile device 150 which facilitates network traffic management between the mobile device 150, an application server or content provider 110, or other servers such as an ad server 120A, promotional content server 120B, or an e-coupon server 120C for traffic management, resource conservation and content caching. The network-side proxy 114 in the operator network 106 can further enhance mobile traffic management and resource conservation in a mobile network.

The distributed proxy and cache system can include, for example, the proxy server 125 (e.g., remote proxy) and the server cache 135 components on the server side. The server-side proxy 125 and cache 135 can, as illustrated, reside internal to the host server 100. In addition, the proxy server 125 and cache 135 on the server-side can be partially or wholly external to the host server 100 and in communication via one or more of the networks 106 and 108. For example, the proxy server 125 may be external to the host server and the server cache 135 may be maintained at the host server 100. Alternatively, the proxy server 125 may be within the host server 100 while the server cache is external to the host server 100. In addition, each of the proxy server 125 and the cache 135 may be partially internal to the host server 100 and partially external to the host server 100. The application server/content provider 110 can by any server including third party servers or service/content providers further including advertisement, promotional content, publication, or electronic coupon servers or services. Similarly, separate advertisement servers 120*a*, promotional content servers 120*b*, and/or e-Coupon servers 120*c* as application servers or content providers are illustrated by way of example.

The distributed system can also, include, in one embodiment, client-side components, including by way of example but not limitation, a local proxy 175 (e.g., a mobile client on a mobile device) and/or a local cache 185, which can, as illustrated, reside internal to the device 150 (e.g., a mobile device).

In addition, the client-side proxy 175 and local cache 185 can be partially or wholly external to the device 150 and in communication via one or more of the networks 106 and 108. For example, the local proxy 175 may be external to the device 150 and the local cache 185 may be maintained at the device 150. Alternatively, the local proxy 175 may be within the device 150 while the local cache 185 is external to the device 150. In addition, each of the proxy 175 and the cache 185 may be partially internal to the host server 100 and partially external to the host server 100.

The distributed system can further include, in one embodiment, network-side components, including by way of example but not limitation, a network-side proxy 114 (e.g., a component in the operator network) and/or a network-side cache (not shown), which can, as shown, reside in the operator network 106.

The network-side proxy 114 may be external to the mobile device 150, the third-party servers (e.g., 110, 120A, 120B, 120C, and the like) and the host server 100. In one embodiment, the network-side proxy 114 may reside in the operator's core network as an inline proxy through which all incoming/outgoing traffic to/from the mobile device is routed. In another embodiment, the network-side proxy 114 may reside in the radio access network, and may have knowledge of the radio state of the mobile device from the network, or from real time information provided by the local proxy 175 and/or the proxy server 125 regarding radio state promotions and demotions.

In one embodiment, the distributed system can include an optional caching proxy server 199. The caching proxy server 199 can be a component which is operated by the application server/content provider 110, the host server 100, or a network service provider 112, and or any combination of the above to facilitate network traffic management for network and device resource conservation. Proxy server 199 can be used, for example, for caching content to be provided to the device 150, for example, from one or more of the application server/provider 110, host server 100, and/or a network service provider 112. Content caching can also be entirely or partially performed by the remote proxy 125 to satisfy application requests or other data requests at the device 150.

In context aware traffic management and optimization for resource conservation and/or congestion alleviation in a network (e.g., cellular or other wireless networks), characteristics of user activity/behavior and/or application behavior at a mobile device (e.g., any wireless device) 150 can be tracked by the local proxy 175 and communicated, over the network 106 to the proxy server 125 component in the host server 100, for example, as connection metadata. The proxy server 125 which in turn is coupled to the application server/provider 110 provides content and data to satisfy requests made at the device 150.

In addition, the local proxy 175 can identify and retrieve mobile device properties, including one or more of, battery level, network that the device is registered on, radio state, signal strength, cell identifier (i.e., cell ID), location area code, or whether the mobile device is being used (e.g., interacted with by a user). In some instances, the local proxy 175 can delay, expedite (pre-fetch), and/or modify data prior to transmission to the proxy server 125, when appropriate, as will be further detailed with references to the description associated with the examples of FIG. 2A.

The local cache 185 can be included in the local proxy 175 or coupled to the local proxy 175 and can be queried for a locally stored response to the data request prior to the data request being forwarded on to the proxy server 125. Locally cached responses can be used by the local proxy 175 to satisfy certain application requests of the mobile device 150, by retrieving cached content stored in the cache storage 185, when the cached content is still valid.

Similarly, the proxy server 125 of the host server 100 can also delay, expedite, or modify data from the local proxy prior to transmission to the content sources (e.g., the application server/content provider 110). In addition, the proxy server 125 uses device properties and connection metadata to generate rules for satisfying request of applications on the mobile device 150. The proxy server 125 can gather real time traffic information about requests of applications for later use in optimizing similar connections with the mobile device 150 or other mobile devices. The proxy server 125 can further aggregate reports on detection of congestion from multiple mobile devices to provide reports on congestion distribution and timing patterns and other information to operators of the networks.

In general, the local proxy 175, the proxy server 125 and/or the network-side proxy 114 are transparent to the multiple applications executing on the mobile device. The local proxy 175 is generally transparent to the operating system or platform of the mobile device and may or may not be specific to device manufacturers. In some instances, the local proxy 175 is optionally customizable in part or in whole to be device specific. In some embodiments, the local proxy 175 may be bundled into a wireless model, a firewall, and/or a router. Similarly, the network-side proxy 114 can be customizable in part on in whole to be network operator specific. For example, traffic management policies for one network operator may be different from policies for another network operator.

In one embodiment, the host server 100 can in some instances, utilize the store and forward functions of a short message service center (SMSC) 112, such as that provided by the network service provider in communicating with the device 150 in achieving network traffic management. Note that SMSC 112 can also utilize any other type of alternative channel including USSD or other network control mechanisms. The host server 100 can forward content or HTTP responses to the SMSC 112 such that it is automatically forwarded to the client device 150 if available, and for subsequent forwarding if the client device 150 is not currently available.

In general, the disclosed distributed proxy and cache system allows optimization of network usage, for example, by serving requests from the local cache 185, the local proxy 175 reduces the number of requests that need to be satisfied over the network 106. Further, the local proxy 175 and the proxy server 125 may filter irrelevant data from the communicated data. In addition, the local proxy 175, the proxy server 125 and/or the network-side proxy 114 can also accumulate background requests and low priority data and send it in batches to avoid the protocol overhead of sending individual data fragments and establishing data connections. The local proxy 175, the network-side proxy 114 and/or the proxy server 125 can also compress or transcode the traffic, reducing the amount of data sent over the network 106 and/or 108. The network-side proxy can further block unnecessary data (e.g., during socket closure) from reaching the mobile device and causing the radio on the mobile device to turn on. The network-side proxy can also supply cached responses to third-party servers to keep the servers happy, and prevent them from retrying. The signaling traffic in the network 106 and/or 108 can be reduced, as the networks are now used less often and the network traffic can be synchronized among individual applications.

With respect to the battery life of the mobile device 150, by serving application or content requests from the local cache 185, the local proxy 175 can reduce the number of times the radio module is powered up. The local proxy 175, the network-side proxy 114 and the proxy server 125 can work in conjunction to accumulate background requests and other low priority data and send such data in batches to reduce the number of times and/or length of time when the radio is powered up. The local proxy 175 can synchronize the network use by performing the batched data transfer for all connections simultaneously.

Figure 1D:
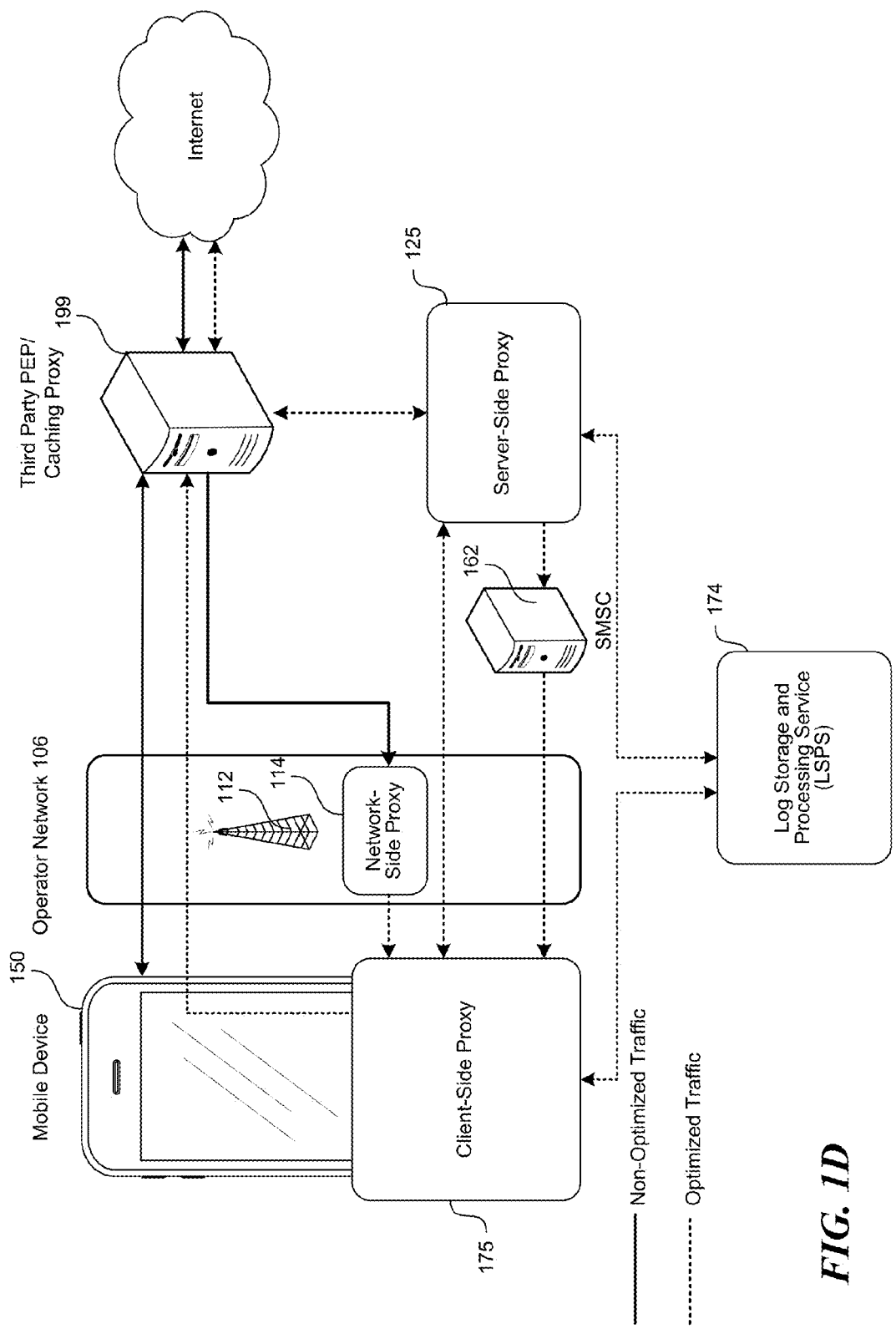
FIG. 1D illustrates an example diagram of the logical architecture of a distributed proxy and cache system, including a client-side proxy, a server-side proxy, a network-side proxy and a log storage and processing service.

FIG. 1D illustrates an example diagram of the logical architecture of a distributed proxy and cache system which can include components such as a client-side proxy 175, a server-side proxy 125, a network-side proxy 114 and a log storage and processing service 174. Some example components of the distributed proxy and cache system are described as follows:

Client Side Proxy 175: A component installed in a smartphone, mobile device or wireless device 150 that interfaces with device's operating system, as well as with data services and applications installed in the device. The client side proxy 175 is typically compliant with and able to operate with standard or state of the art networking protocols.

Figure 2A:
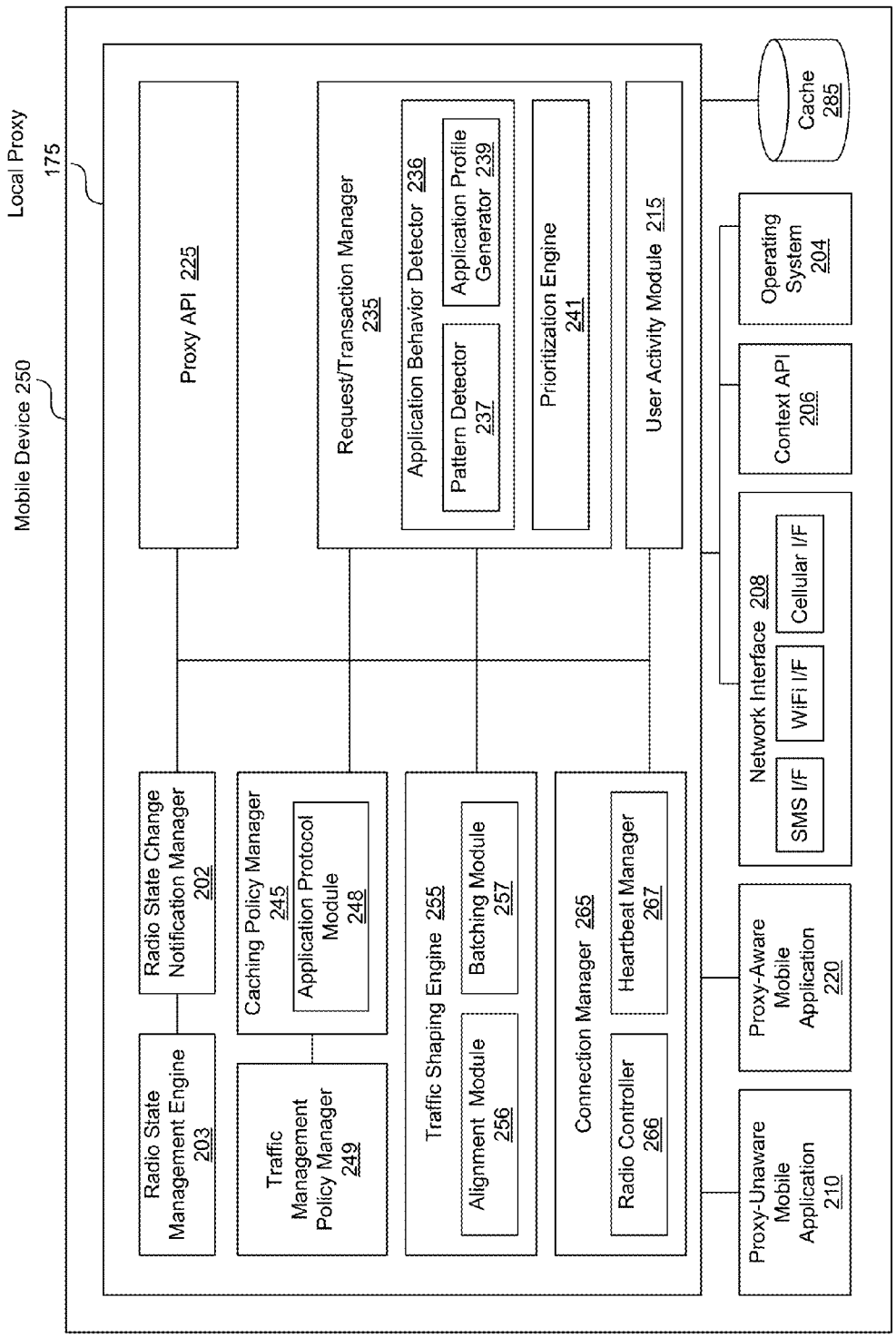
FIG. 2A illustrates a block diagram depicting an example of client-side components in a distributed proxy and cache system, including components for managing outgoing traffic from multiple applications on a mobile device to enhance mobile traffic management and resource conservation in a mobile network.
Figure 2B:
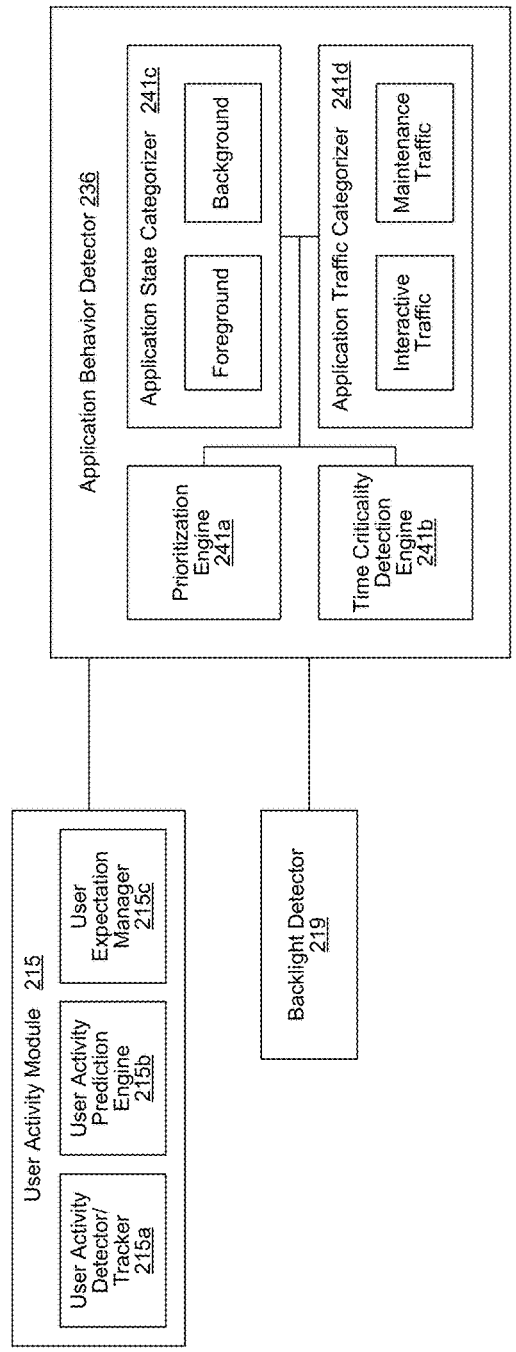
FIG. 2B illustrates a block diagram depicting additional components in a user activity module and an application behavior detector, shown in the example of FIG. 2A.

Additional components and features of the client-side proxy 175 are illustrated with further references to the examples of FIGS. 2A-2B.

Network-Side Proxy 114: A component in the operator network 152 (the core network or the radio access network 112) that interfaces with mobile devices 150, third-party servers (e.g., application server/content providers 110, caching proxy server 199) and server-side proxy 125. The network-side proxy 114 can be configured as the last node for incoming traffic, before the incoming traffic reaches the radio modem on the mobile device. The network-side proxy 114 is typically compliant with and able to operate with standard or state of the art networking protocols and/or other requirements specific to the network operator. Additional components and features of the network-side proxy 114 are illustrated with further references to the examples of FIG. 3.

The server side proxy 125 can include one or more servers that can interface with third party application servers (which can be proxy 199 or other servers that is not illustrated), the client-side proxy 175 and/or the network-side proxy 114. In general, the server side proxy 125 can be compliant with and is generally able to operate with standard or state of the art networking protocols and/or specifications for interacting with mobile network elements and/or third party servers. Some components and features of the server-side proxy 125 are illustrated with further references to the examples of FIG. 1G and FIGS. 4A-4C.

Log Storage and Processing Service (LSPS) 174: The log storage and processing service, server, system or component 174 can provide reporting and usage analytics services. The LSPS 174 can collect information (e.g., logs) from the client side proxy 175, the network-side proxy 114 and/or the server side proxy 125 and provide the necessary tools for producing reports and usage analytics can used for analyzing traffic and signaling data or behavior across applications, servers, and the like. The client logs (e.g., logs on the client device 150 aggregated by the local proxy 175) are stored in the device until a data channel is activated, and then are transferred in binary format to the LSPS 174. In one embodiment, the logs are processed using log processing tools provided by the LSPS 174. The processed logs are subsequently stored in a distributed database. The logs may be used for reporting as well as for troubleshooting issues. For example, analytics from the logs can be used by the proxy system in managing, reducing or optimizing network traffic or by the network operator in monitoring their networks for possible improvements and enhancements. Note that LSPS 174 as illustrated may be a server separate from the server-side proxy 125, or it may be a component of the server-side proxy 125 residing partially or wholly therein.

In one implementation, the level of logging (e.g., types of data to be logged, and the like) can be specified using configuration settings in the client-side proxy 175, the network-side proxy 114 and/or the server-side proxy 125. Various data relating to bytes and transactions, network connectivity, power, subscriber count, and the like may be logged, and/or processed using default (or another) settings on a periodic (e.g., hourly, daily, and the like) basis.

Bytes and Transactions data may include a number of bytes transacted (both to and from), total number of transactions between the client-side proxy 175 and each application, the client-side proxy 175 and the network (e.g., radio access network 112), the client-side proxy 175 and its cache, and the like. Network Connectivity data may include, for example, total time the device spends in "data connected" state (based on a two-state connectivity model), total number of transitions into the data connected state, the number of times the radio transitions into the data connected state due to a network request that was proxied through the client-side proxy 175, total time spent in the data connected state due to a network request that was proxied through the client-side proxy 175, the number of transitions into data connected mode saved by the client-side and/or server-side proxy system, the amount of time in data connected state saved by the client-side and/or server-side proxy system and simulated values for the previous four items, as if traffic proxied via client-side and/or server-side proxy system were the only traffic on the device. Network connectivity data can also include the amount of time taken to transition from an idle state to connected state (i.e., setup time), a baseline or a reference determined from a sample of setup times, and the like. Power related data may include, for example, each one-percent (or any other percentage value) change in the battery level, the total time the device is powered on but not connected to a power source, and the like. Subscriber count data may include, for example, the number of new subscribers observed in a period and the number of active subscribers in the period. This data may be aggregated by the host server, for example. Reporting of the above data can be done based on variables such as network bearer type (e.g., all, mobile or Wi-Fi), category (e.g., all, device model or application name), time (e.g., hour, day or month), and the like, or combinations thereof.

Figure 1E:
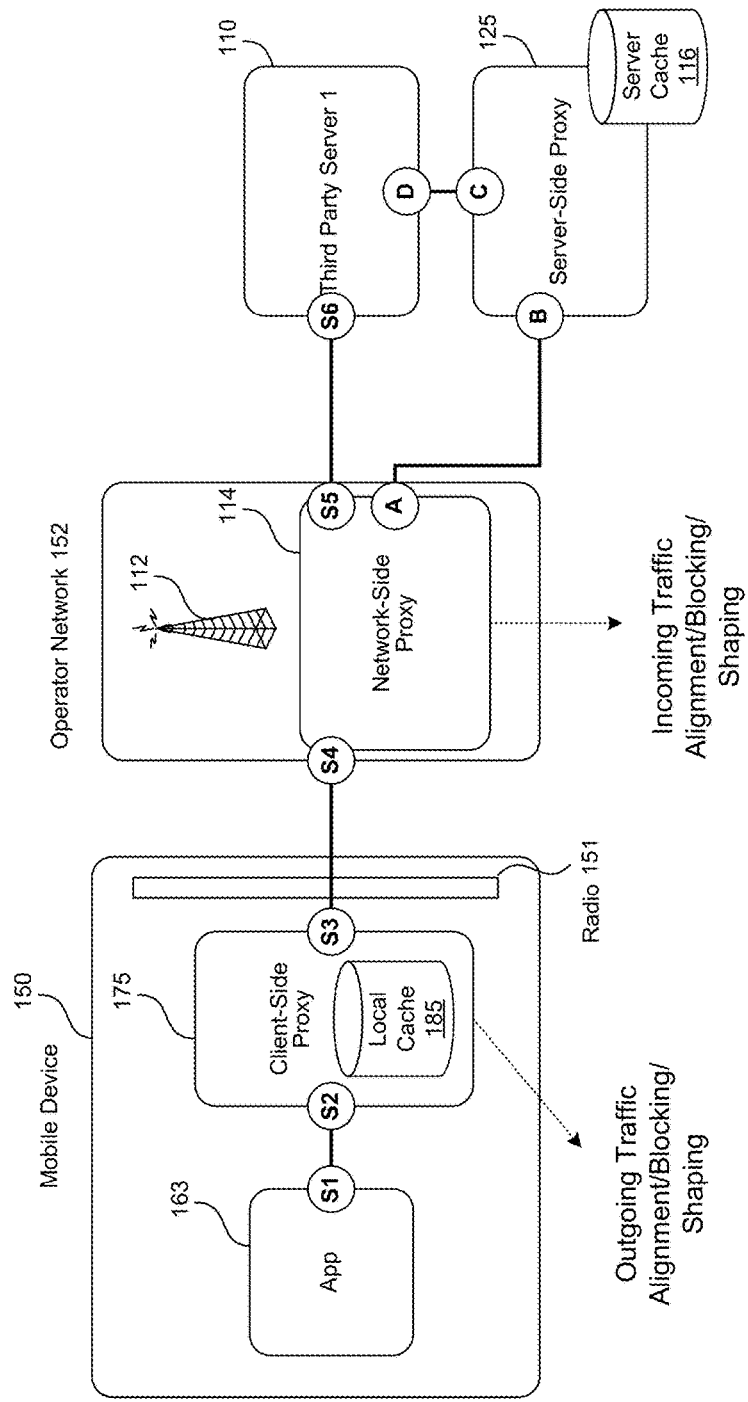
FIG. 1E illustrates an example diagram of the logical architecture of a distributed proxy and cache system comprising six sockets distributed over a client-side proxy, a network-side proxy and a third-party server to enhance mobile traffic management and resource conservation in a mobile network.

FIG. 1E illustrates an example diagram of the logical architecture of a distributed proxy and cache system comprising six sockets distributed over a client-side proxy 175, a network-side proxy 114 and a server-side proxy 125 to enhance mobile traffic management in a mobile network. As illustrated, a mobile device 150 includes an application 163 that is in communication with a client-side proxy 175 having a local cache 185. The client-side proxy 175 is in communication with a network-side proxy 114, which is in communication with a third-party server 110 (e.g., an application server/content provider 110, ad server 120a, promotional content server 120b or e-coupon server 120c in FIGS. 1B and 1C) and a server-side proxy 125 having a server cache 116. Each component's socket end is identified in FIG. 1E by a corresponding socket number S1-S6 and A-B. Each socket end has its own timeout or tolerance (e.g., TCP (Transport Control Protocol) timeout). The timeouts in some of these sockets can be controlled for managing traffic and consequently for conserving resources.

For example, S1 is a socket utilized, managed and/or controlled by the application 163. The local proxy 175 can overwrite the properties of S1 (e.g., timeout settings such as timeout for reading data on already established socket and/or timeout for establishing the socket). As a consequence, the application 163 can tolerate delays in sending requests or receiving responses, without timing out. Thus, the socket S1 is controllable, manipulable and/or configurable/reconfigurable by the local proxy 175.

S2 and S3 are sockets managed and/or controlled by the local proxy 175, are also controllable, manipulable and/or configurable/reconfigurable by the local proxy 175. For example, the local proxy 175 can also modify the timeout settings for S2 and S3 and thus delay requests from the application 163 along with requests from any other applications on the mobile device 150. By having control over S1-S3, the local proxy 175 can effectively intercept outgoing requests from multiple applications on the mobile device and accumulate those outgoing requests such that multiple outgoing requests from multiple applications can be sent out at the same time, using the same radio connection to the mobile network.

S4 and S5 are sockets utilized, managed and/or controlled by the network-side proxy 114 and therefore controllable, manipulable and/or configurable/reconfigurable by the network-side proxy 114. Having control over S4 and S5 means that incoming requests from the third-party server 110 (e.g., requests initiated from third party server 110, response from third-party server 110 to a request from the mobile device 150) can be intercepted by and accumulated at the network-side proxy 114. The network-side proxy 114 and the local proxy 175 can then coordinate with each other such that the transfer of the accumulated incoming requests from the network-side proxy 114 to the mobile device and transfer of the outgoing requests from the mobile device to one or more third-party servers via the network-side proxy 114 occur during an agreed or determined interval of time, using the same radio connection to the mobile network.

S6 is a socket utilized, managed and/or controlled by the third-party server 110, and therefore, in some instance, may be beyond the control of the local proxy 175, the network-side proxy 114 and/or the server-side proxy 125. Typically third-party servers tend to timeout and close the TCP connection if they do not hear anything from the client. By terminating an idle TCP connection, third-party servers can save on system memory and other resources. For example, if the third-party server 110 is waiting for a keepalive packet, but does not receive any such packet from application 163 on the mobile device 150, the third-party server 110 can terminate the TCP connection to save on resources. A TCP connection is usually terminated by sending a FIN packet. In some cases, third party servers can generate and send some data to test the TCP connection or can attempt a number of retries based on a backoff algorithm. These data packets from the activities on the third-party server 110 can cause extra signaling in the mobile network. However, since S6 usually cannot be controlled by the network-side proxy 114 or the server-side proxy 125, it is usually not possible to prevent the third-party server from sending these packets.

The network-side proxy 114 can, in an embodiment, intercept and prevent such data from third-party servers from being delivered to the mobile device to save on signaling. In a further embodiment, the network-side proxy 114 can determine whether the data from third-party servers is unnecessary, and if so, block the data from being sent to the mobile device when a radio connection is not established. In some embodiments, the network-side proxy 114 can categorize certain types of data as unnecessary based on a policy. For example, data relating to socket closures or data relating to testing of a connection, acknowledgements, and the like can be considered unnecessary when a radio on the mobile device is idle, or regardless of the radio state. For example, if the third-party server 110 sends a FIN packet to terminate a TCP connection when a radio on the mobile device is idle (i.e., TCP connection is already terminated), the FIN packet can be categorized as unnecessary data and blocked from being delivered at that instant. The unnecessary data may also be permanently blocked from being delivered in some cases.

In some embodiments, the network-side proxy 114 can further keep third party servers in an unaware or content state by providing safe responses (e.g., cached responses) to requests, without having to send the requests to the mobile device. For example, when the third-party server 110 generates and sends some data to test a TCP connection, the network-side proxy 114 can respond with a cached response (e.g., an ACK or other expected response). The cached response from the network-side proxy 114 can placate the third-party server 110 and prevent the third-party server from, for example, assuming that the TCP connection is idle and in response, terminating the TCP connection.

Figure 1F:
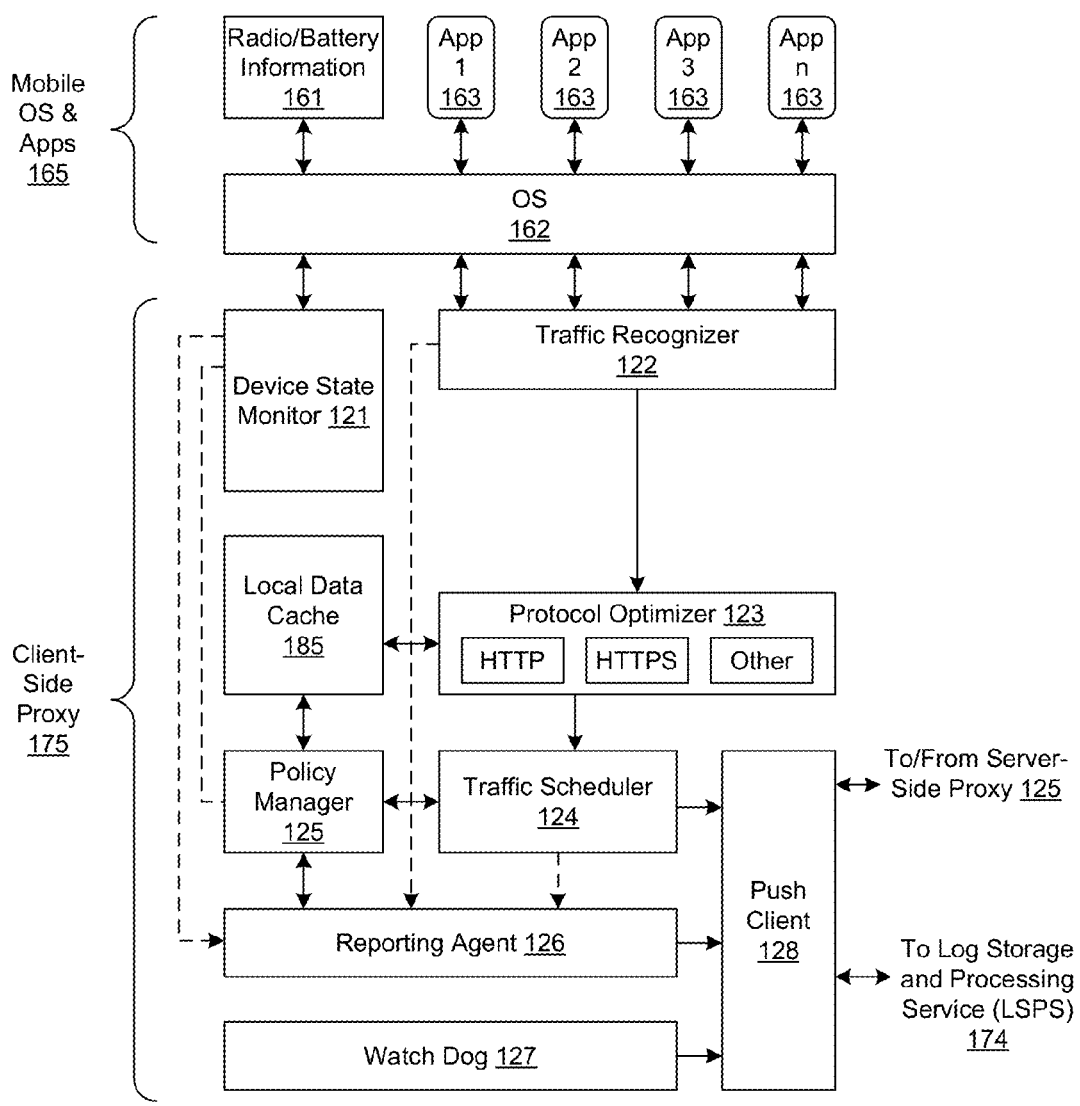
FIG. 1F illustrates an example diagram showing the architecture of client side components in a distributed proxy and cache system.

FIG. 1F illustrates an example diagram showing the architecture of client side components in a distributed proxy and cache system.

The client side proxy 175 can include software components or agents installed on the mobile device that enable traffic optimization and perform the related functionalities on the client side. Components of the client side proxy 175 can operate transparently for end users and applications 163, and interface with the device's operating system (OS) 162. The client side proxy 175 can be installed on mobile devices for optimization to take place, and it can effectuate changes on the data routes and/or timing. Once data routing is modified, the client side proxy 175 can respond to application requests to service providers or host servers, in addition to or instead of letting those applications 163 access data network directly. In general, applications 163 on the mobile device will not notice that the client side proxy 175 is responding to their requests.

Some example components of the client side proxy 175 are described as follows:

Device State Monitor 121: The device state monitor 121 can be responsible for identifying several states and metrics in the device, such as network status, display status, battery level (e.g., via the radio/battery information 161), etc., such that the remaining components in the client side proxy 175 can operate and make decisions according to device state, acting in an optimal way in each state.

Traffic Recognizer 122: The traffic recognizer 122 analyzes all traffic between the wireless device applications 163 and their respective host servers in order to identify recurrent patterns. Supported transport protocols include, for example, DNS, HTTP and HTTPS, such that traffic through those ports is directed to the client side proxy 175. While analyzing traffic, the client side proxy 175 can identify recurring polling patterns which can be candidates to be performed remotely by the server side proxy 125, and send to the protocol optimizer 123.

Protocol Optimizer 123: The protocol optimizer 123 can implement the logic of serving recurrent requests from the local cache 185 instead of allowing those requests to go over the network to the service provider/application host server. One of its tasks is to eliminate or minimize the need to send requests to the network, positively affecting network congestion and device battery life.

Local Cache 185: The local cache 185 can store responses to recurrent requests, and can be used by the Protocol Optimizer 123 to send responses to the applications 163.

Traffic Scheduler 124: The traffic scheduler 124 can temporally move communications to optimize usage of device resources by unifying keep-alive signaling so that some or all of the different applications 163 can send keep-alive messages at the same time (traffic pipelining). Traffic scheduler 124 may also decide to delay transmission of data that is not relevant at a given time (for example, when the device is not actively used).

Policy Manager 125: The policy manager 125 can store and enforce traffic management and/or optimization and/or reporting policies provisioned by a Policy Management Server (PMS). At the client side proxy 175 first start, traffic management and/or optimization and reporting policies (policy profiles) that is to be enforced in a particular device can be provisioned by the Policy Management Server. Enforcing traffic management policies at the device's IP layer lets an operator manage traffic before it uses radio accessed network resources. Policy usage can range from creating highly targeted subscriber plans to proactively and/or reactively managing network congestion. In one implementation, the conditions for selecting a policy for enforcement, and/or conditions for dropping an implemented policy may be managed or coordinated by the policy manager 125.

Watch Dog 127: The watch dog 127 can monitor the client side proxy 175 operating availability. In case the client side proxy 175 is not working due to a failure or because it has been disabled, the watchdog 127 can reset DNS routing rules information and can restore original DNS settings for the device to continue working until the client side proxy 175 service is restored.

Reporting Agent 126: The reporting agent 126 can gather information (e.g., logs) about the events taking place in the device and sends the information to the log storage and processing service 174, which collects and stores client-side and/or server-side proxy system logs. Event details are stored temporarily in the device and transferred to log storage and processing service 174 only when the data channel state is active. If the client side proxy 175 does not send records within a period of time (e.g., twenty-four hours), the reporting agent 126 may, in one embodiment, attempt to open the connection and send recorded entries or, in case there are no entries in storage, an empty reporting packet. All reporting settings may be configured in the policy management server. The information in the logs may be used for reporting and/or troubleshooting, for example.

Push Client 128: The push client 128 can be responsible for the traffic between the server side proxy 125 and the client side proxy 175. The push client 128 can send out service requests like content update requests and policy update requests, and receives updates to those requests from the server side proxy 125. In addition, push client 128 can send data to a log storage and processing service 176, which may be internal to or external to the server side proxy 125.

Figure 1G:
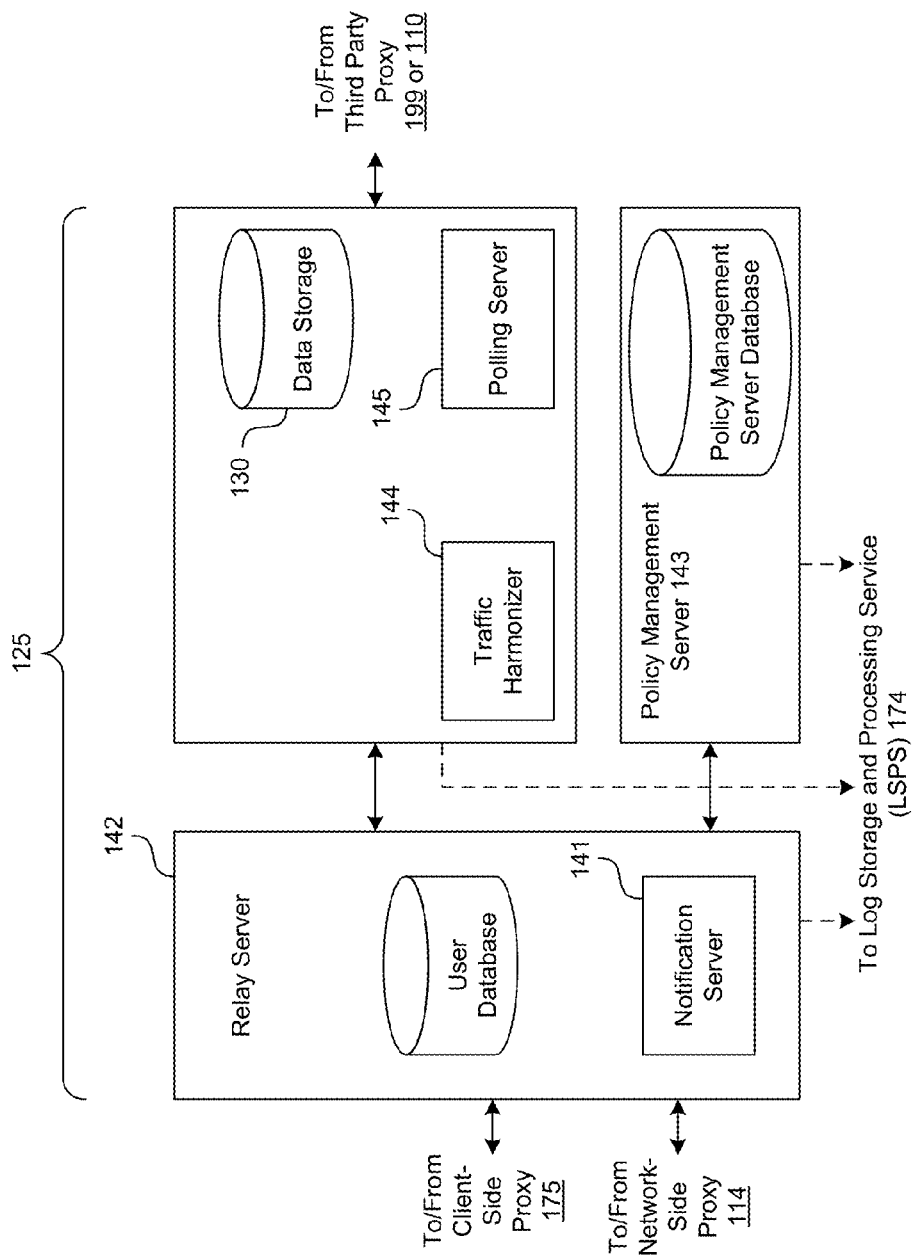
FIG. 1G illustrates a diagram of example components on a server side of a distributed proxy and cache system.

FIG. 1G illustrates a diagram of example components on a server side of a distributed proxy and cache system.

The server side 125 of the distributed system can include, for example a relay server 142, which interacts with a traffic harmonizer 144, a polling server 145 and/or a policy management server 143. Each of the various components can communicate with the client side proxy 175, the network-side proxy 114 or other third party (e.g., application server/service provider 110 and/or other proxy 199) and/or a LSPS 174. Some example components of the server side proxy 125 is described as follows:

Relay Server 142: The relay server 142 is the routing agent in the distributed proxy architecture. The relay server 142 manages connections and communications with components on the client-side proxy 175 installed on devices and provides an administrative interface for reports (e.g., congestion reports), provisioning, platform setup, and so on.

Notification Server 141: The notification server 141 is a module able to connect to an operator's SMSC gateways and deliver SMS notifications to the client-side proxy 175. SMS notifications can be used when an IP link is not currently active, in order to avoid the client-side proxy 175 from activating a connection over the wireless data channel, thus avoiding additional signaling traffic. However, if the IP connection happens to be open for some other traffic, the notification server 141 can use it for sending the notifications to the client-side proxy 175. The user database can store operational data including endpoint (MSISDN), organization and Notification server 141 gateway for each resource (URIs or URLs).

Traffic Harmonizer 144: The traffic harmonizer 144 can be responsible for communication between the client-side proxy 175 and the polling server 145. The traffic harmonizer 144 connects to the polling server 145 directly or through the data storage 130, and to the client over any open or proprietary protocol such as the 7TP, implemented for traffic optimization. The traffic harmonizer 144 can be also responsible for traffic pipelining on the server side: if there's cached content in the database for the same client, this can be sent over to the client in one message.

Polling Server 145: The polling server 145 can poll third party application servers on behalf of applications that are being optimized). If a change occurs (i.e. new data available) for an application, the polling server 145 can report to the traffic harmonizer 144 which in turn sends a notification message to the client-side proxy 175 for it to clear the cache and allow application to poll application server directly.

Policy Management Server 143: The policy management server (PMS) 143 allows administrators to configure and store policies for the client-side proxies 175 (e.g., mobile device policies). It also allows administrators to notify the client-side proxies 175 about policy changes. In some embodiments, the PMS 143 allows administrators to configure and store policies for network-side proxies 114 (e.g., operator policies). For example, using the policy management server 143, each operator can configure the policies to work in the most efficient way for the unique characteristics of each particular mobile operator's network.

Log Storage and Processing Service 174: The log storage and processing service 174 collects information (e.g., logs) from the client side 175 and/or from the server side 125, and provides the tools for analyzing and producing reports and usage analytics that network operators can use for analyzing application signaling (e.g., determine percent reduction in application signaling), data consumption, congestion, improvement in battery performance, and the like.

The proxy server 199 has a wide variety of uses, from speeding up a web server by caching repeated requests, to caching web, DNS and other network lookups for a group of clients sharing network resources. The proxy server 199 is optional. The distributed proxy and cache system (125 and/or 175) allows for a flexible proxy configuration using either the proxy 199, additional proxy(s) in operator's network, or integrating both proxies 199 and an operator's or other third-party's proxy.

FIG. 2A illustrates a block diagram depicting an example of client-side components in a distributed proxy and cache system, including components for managing outgoing traffic from multiple applications on a mobile device 250 to enhance mobile traffic management and resource conservation in a mobile network.

The mobile device 250, which can be a device that is portable or mobile (e.g., any wireless device), such as a portable phone, generally includes, for example, a network interface 208, an operating system 204, a context API 206, and mobile applications which may be proxy-unaware 210 or proxy-aware 220. Note that the client device 250 is specifically illustrated in the example of FIG. 2A as a mobile device, such is not a limitation and that mobile device 250 may be any wireless, broadband, portable/mobile or non-portable device able to receive, transmit signals to satisfy data requests over a network including wired or wireless networks (e.g., Wi-Fi, cellular, Bluetooth, LAN, WAN, and the like).

The network interface 208 can be a networking module that enables the device 250 to mediate data in a network with an entity that is external to the host server 250 through any known and/or convenient communications protocol supported by the host and the external entity. The network interface 208 can include one or more of a network adaptor card, a wireless network interface card (e.g., SMS interface, Wi-Fi interface, interfaces for various generations of mobile communication standards including but not limited to 2G, 3G, 3.5G, 4G, LTE, and the like), Bluetooth, or whether or not the connection is via a router, an access point, a wireless router, a switch, a multilayer switch, a protocol converter, a gateway, a bridge, a bridge router, a hub, a digital media receiver, and/or a repeater.

The mobile device 250 can further include, client-side components of the distributed proxy and cache system which can include, a local proxy 175 (e.g., a mobile client of the mobile device 250) and a cache 285. In one embodiment, the local proxy 175 includes a user activity module 215, a proxy API 225, a request/transaction manager 235, a caching policy manager 245 having an application protocol module 248, a traffic management policy module 249, a traffic shaping engine 255, a connection manager 265, a radio state management engine 204 and/or a radio state change notification engine 202. The traffic shaping engine 255 may further include an alignment module 256 and/or a batching module 257, the connection manager 265 may further include a radio controller 266 and a heartbeat manager 267. The request/transaction manager 235 can further include an application behavior detector 236 and/or a prioritization engine 241, the application behavior detector 236 may further include a pattern detector 237 and/or and application profile generator 239.

In one embodiment, a portion of the distributed proxy and cache system for mobile traffic management resides in or is in communication with the mobile device 250, including local proxy 175 (mobile client) and/or cache 285. The local proxy 175 can provide an interface on the mobile device 250 for users to access device applications and services including email, IM, voice mail, visual voicemail, feeds, Internet, games, productivity tools, or other applications, etc.

The local proxy 175 is generally application independent and can be used by applications (e.g., both proxy-aware and proxy-unaware applications 210 and 220 and other mobile applications) to open TCP (Transport Control Protocol) or other protocol based connections to a remote server (e.g., the server 100 in the examples of FIGS. 1B-1C and/or server proxy 125 shown in the examples of FIG. 1B. In some instances, the local proxy 175 includes a proxy API 225 which can be optionally used to interface with proxy-aware applications 220 (or applications (e.g., mobile applications) on a mobile device (e.g., any wireless device)).

The applications 210 and 220 can generally include any user application, widgets, software, HTTP-based application, web browsers, video or other multimedia streaming or downloading application, video games, social network applications, email clients, RSS management applications, application stores, document management applications, productivity enhancement applications, and the like. The applications can be provided with the device OS, by the device manufacturer, by the network service provider, downloaded by the user, or provided by others.

One embodiment of the local proxy 175 includes or is coupled to a context API 206, as shown. The context API 206 may be a part of the operating system 204 or device platform or independent of the operating system 204, as illustrated. The operating system 204 can include any operating system including but not limited to, any previous, current, and/or future versions/releases of, Windows Mobile, iOS, Android, Symbian, Palm OS, Brew MP, Java 2 Micro Edition (J2ME), Blackberry, etc.

The context API 206 may be a plug-in to the operating system 204 or a particular client/application on the device 250. The context API 206 can detect signals indicative of user or device activity, for example, sensing motion, gesture, device location, changes in device location, device backlight, keystrokes, clicks, activated touch screen, mouse click or detection of other pointer devices. The context API 206 can be coupled to input devices or sensors on the device 250 to identify these signals. Such signals can generally include input received in response to explicit user input at an input device/mechanism at the device 250 and/or collected from ambient signals/contextual cues detected at or in the vicinity of the device 250 (e.g., light, motion, piezoelectric, etc.).

In one embodiment, the user activity module 215 interacts with the context API 206 to identify, determine, infer, detect, compute, predict, and/or anticipate, characteristics of user activity on the device 250. Various inputs collected by the context API 206 can be aggregated by the user activity module 215 to generate a profile for characteristics of user activity. Such a profile can be generated by the user activity module 215 with various temporal characteristics. For instance, user activity profile can be generated in real-time for a given instant to provide a view of what the user is doing or not doing at a given time (e.g., defined by a time window, in the last minute, in the last 30 seconds, etc.), a user activity profile can also be generated for a 'session' defined by an application or web page that describes the characteristics of user behavior with respect to a specific task they are engaged in on the mobile device 250, or for a specific time period (e.g., for the last 2 hours, for the last 5 hours).

Additionally, characteristic profiles can be generated by the user activity module 215 to depict a historical trend for user activity and behavior (e.g., 1 week, 1 mo., 2 mo., etc.). Such historical profiles can also be used to deduce trends of user behavior, for example, access frequency at different times of day, trends for certain days of the week (weekends or week days), user activity trends based on location data (e.g., IP address, GPS, or cell tower coordinate data) or changes in location data (e.g., user activity based on user location, or user activity based on whether the user is on the go, or traveling outside a home region, etc.) to obtain user activity characteristics.

In one embodiment, user activity module 215 can detect and track user activity with respect to applications, documents, files, windows, icons, and folders on the device 250. For example, the user activity module 215 can detect when an application or window (e.g., a web browser or any other type of application) has been exited, closed, minimized, maximized, opened, moved into the foreground or into the background, multimedia content playback, etc.

In one embodiment, characteristics of the user activity on the device 250 can be used to locally adjust behavior of the device (e.g., mobile device or any wireless device) to optimize its resource consumption such as battery/power consumption and more generally, consumption of other device resources including memory, storage, and processing power, and/or further optimize signaling in the network. In one embodiment, the use of a radio on a device can be adjusted based on characteristics of user behavior (e.g., by the radio controller 266 of the connection manager 265) coupled to the user activity module 215. For example, the radio controller 266 can turn the radio on or off, based on characteristics of the user activity on the device 250. In addition, the radio controller 266 can adjust the power mode of the radio (e.g., to be in a higher power mode or lower power mode) depending on characteristics of user activity.

In one embodiment, characteristics of the user activity on device 250 can also be used to cause another device (e.g., other computers, a mobile device, a wireless device, or a non-portable device) or server (e.g., host server 100 in the examples of FIG. 1B-1C) which can communicate (e.g., via a cellular or other network) with the device 250 to modify its communication frequency with the device 250. The local proxy 175 can use the characteristics information of user behavior determined by the user activity module 215 to instruct the remote device as to how to modulate its communication frequency (e.g., decreasing communication frequency, such as data push frequency if the user is idle, requesting that the remote device notify the device 250 if new data, changed, data, or data of a certain level of importance becomes available, etc.).

In one embodiment, the user activity module 215 can, in response to determining that user activity characteristics indicate that a user is active after a period of inactivity, request that a remote device (e.g., server host server 100 or the network-side proxy 114 in the examples of FIG. 1B-1C) send the data that was buffered as a result of the previously decreased communication frequency.

In addition, or in alternative, the local proxy 175 can communicate the characteristics of user activity at the device 250 to the remote device (e.g., host server 100 or the network-side proxy 114 in the examples of FIGS. 1B-1C) and the remote device determines how to alter its own communication frequency with the device 250 for network resource conservation and conservation of resources of the mobile device 250.

One embodiment of the local proxy 175 further includes a request/transaction manager 235, which can detect, identify, intercept, process, manage, data requests initiated on the device 250, for example, by applications 210 and/or 220, and/or directly/indirectly by a user request. Such data requests can be asynchronous requests. The request/transaction manager 235 can determine how and when to process a given request or transaction, or a set of requests/transactions, based on transaction characteristics.

The request/transaction manager 235 can prioritize requests or transactions made by applications and/or users at the device 250, for example by the prioritization engine 241. Importance or priority of requests/transactions can be determined by the request/transaction manager 235 by applying a rule set, for example, according to time sensitivity of the transaction, time sensitivity of the content in the transaction, time criticality of the transaction, time criticality of the data transmitted in the transaction, and/or time criticality or importance of an application making the request.

In addition, transaction characteristics can also depend on whether the transaction was a result of user-interaction or other user-initiated action on the device (e.g., user interaction with an application (e.g., a mobile application)). In general, a time critical transaction can include a transaction resulting from a user-initiated data transfer, and can be prioritized as such. Transaction characteristics can also depend on the amount of data that will be transferred or is anticipated to be transferred as a result of the requested transaction. For example, the connection manager 265, can adjust the radio mode (e.g., high power or low power mode via the radio controller 266) based on the amount of data that will need to be transferred.

In addition, the radio controller 266/connection manager 265 can adjust the radio power mode (high or low) based on time criticality/sensitivity of the transaction. The radio controller 266 can trigger the use of high power radio mode when a time-critical transaction (e.g., a transaction resulting from a user-initiated data transfer, an application running in the foreground, any other event meeting a certain criteria) is initiated or detected.

In general, the priorities can be set by default, for example, based on device platform, device manufacturer, operating system, etc. Priorities can alternatively or additionally be set by the particular application; for example, the Facebook application (e.g., a mobile application) can set its own priorities for various transactions (e.g., a status update can be of higher priority than an add friend request or a poke request, a message send request can be of higher priority than a message delete request), an email client or IM chat client may have its own configurations for priority. The prioritization engine 241 may include set of rules for assigning priority.

The prioritization engine 241 can also track network provider limitations or specifications on application or transaction priority in determining an overall priority status for a request/transaction. Furthermore, priority can in part or in whole be determined by user preferences, either explicit or implicit. A user, can in general, set priorities at different tiers, such as, specific priorities for sessions, or types, or applications (e.g., a browsing session, a gaming session versus an IM chat session, the user may set a gaming session to always have higher priority than an IM chat session, which may have higher priority than web-browsing session). A user can set application-specific priorities, (e.g., a user may set Facebook-related transactions to have a higher priority than LinkedIn-related transactions), for specific transaction types (e.g., for all send message requests across all applications to have higher priority than message delete requests, for all calendar-related events to have a high priority, etc.), and/or for specific folders.

The prioritization engine 241 can track and resolve conflicts in priorities set by different entities. For example, manual settings specified by the user may take precedence over device OS settings, network provider parameters/limitations (e.g., set in default for a network service area, geographic locale, set for a specific time of day or set based on service/fee type) may limit any user-specified settings and/or application-set priorities. In some instances, a manual synchronization request received from a user can override some, most, or all priority settings in that the requested synchronization is performed when requested, regardless of the individually assigned priority or an overall priority ranking for the requested action.

Priority can be specified and tracked internally in any known and/or convenient manner, including but not limited to, a binary representation, a multi-valued representation, and a graded representation and all are considered to be within the scope of the disclosed technology.

TABLE I

| Change (initiated on device) | Priority | Change (initiated on server) | Priority |
|---|---|---|---|
| Send email | High | Receive email | High |
| Delete email | Low | Edit email | Often not possible to sync (Low if possible) |
| (Un)read email | Low | | |
| Move message | Low | | |
| Read more | High | | |
| Download attachment | High | New email in deleted items | Low |
| New Calendar event | High | Delete an email | Low |
| Edit/change | High | (Un)Read an email | Low |

TABLE I-continued

| Change (initiated on device) | Priority | Change (initiated on server) | Priority |
|---|---|---|---|
| Calendar event | | Move messages | Low |
| Add a contact | High | Any calendar change | High |
| Edit a contact | High | Any contact change | High |
| Search contacts | High | Wipe/lock device | High |
| Change a setting | High | Settings change | High |
| Manual send/receive | High | Any folder change | High |
| IM status change | Medium | Connector restart | High (if no changes nothing is sent) |
| Auction outbid or change notification | High | | |
| Weather Updates | Low | Social Network Status Updates | Medium |
| | | Severe Weather Alerts | High |
| | | News Updates | Low |

Table I above shows, for illustration purposes, some examples of transactions with examples of assigned priorities in a binary representation scheme. Additional assignments are possible for additional types of events, requests, transactions, and as previously described, priority assignments can be made at more or less granular levels (e.g., at the session level or at the application level, etc.).

As shown by way of example in the above table, in general, lower priority requests/transactions can include, updating message status as being read, unread, deleting of messages, deletion of contacts; higher priority requests/transactions, can in some instances include, status updates, new IM chat message, new email, calendar event update/cancellation/deletion, an event in a mobile gaming session, or other entertainment related events, a purchase confirmation through a web purchase or online, request to load additional or download content, contact book related events, a transaction to change a device setting, location-aware or location-based events/transactions, or any other events/request/transactions initiated by a user or where the user is known to be, expected to be, or suspected to be waiting for a response, etc.

Inbox pruning events (e.g., email, or any other types of messages), are generally considered low priority and absent other impending events, generally will not trigger use of the radio on the device 250. Specifically, pruning events to remove old email or other content can be 'piggy backed' with other communications if the radio is not otherwise on, at the time of a scheduled pruning event. For example, if the user has preferences set to 'keep messages for 7 days old,' then instead of powering on the device radio to initiate a message delete from the device 250 the moment that the message has exceeded 7 days old, the message is deleted when the radio is powered on next. If the radio is already on, then pruning may occur as regularly scheduled.

The request/transaction manager 235, can use the priorities for requests (e.g., by the prioritization engine 241) to manage outgoing traffic from the device 250 for resource optimization (e.g., to utilize the device radio more efficiently for battery conservation). For example, transactions/requests below a certain priority ranking may not trigger use of the radio on the device 250 if the radio is not already switched on, as controlled by the connection manager 265. In contrast, the radio controller 266 can turn on the radio such a request can be sent when a request for a transaction is detected to be over a certain priority level.

In one embodiment, priority assignments (such as that determined by the local proxy 175 or another device/entity) can be used cause a remote device to modify its communication with the frequency with the mobile device or wireless device. For example, the remote device can be configured to send notifications to the device 250 when data of higher importance is available to be sent to the mobile device or wireless device.

In one embodiment, transaction priority can be used in conjunction with characteristics of user activity in shaping or managing traffic, for example, by the traffic shaping engine 255. For example, the traffic shaping engine 255 can, in response to detecting that a user is dormant or inactive, wait to send low priority transactions from the device 250, for a period of time. In addition, the traffic shaping engine 255 can allow multiple low priority transactions to accumulate for batch transferring from the device 250 (e.g., via the batching module 257). In one embodiment, the priorities can be set, configured, or readjusted by a user. For example, content depicted in Table I in the same or similar form can be accessible in a user interface on the device 250 and, for example, used by the user to adjust or view the priorities.

The batching module 257 can initiate batch transfer based on certain criteria. For example, batch transfer (e.g., of multiple occurrences of events, some of which occurred at different instances in time) may occur after a certain number of low priority events have been detected, or after an amount of time elapsed after the first of the low priority event was initiated. In addition, the batching module 257 can initiate batch transfer of the accumulated low priority events when a higher priority event is initiated or detected at the device 250. Batch transfer can otherwise be initiated when radio use is triggered for another reason (e.g., to receive data from a remote device such as host server 100, network-side proxy 114). In one embodiment, an impending pruning event (pruning of an inbox), or any other low priority events, can be executed when a batch transfer occurs.

In general, the batching capability can be disabled or enabled at the event/transaction level, application level, or session level, based on any one or combination of the following: user configuration, device limitations/settings, manufacturer specification, network provider parameters/limitations, platform-specific limitations/settings, device OS settings, etc. In one embodiment, batch transfer can be initiated when an application/window/file is closed out, exited, or moved into the background; users can optionally be prompted before initiating a batch transfer; users can also manually trigger batch transfers.

In one embodiment, the local proxy 175 locally adjusts radio use on the device 250 by caching data in the cache 285. When requests or transactions from the device 250 can be satisfied by content stored in the cache 285, the radio controller 266 need not activate the radio to send the request to a remote entity (e.g., the host server 100, 300, as shown in FIG. 1B and FIGS. 4A-4C or a content provider/application server such as the server/provider 110 shown in the examples of FIGS. 1B-1C). As such, the local proxy 175 can use the local cache 285 and the cache policy manager 245 to locally store data for satisfying data requests to eliminate or reduce the use of the device radio for conservation of network resources and device battery consumption.

In leveraging the local cache, once the request/transaction manager 225 intercepts a data request by an application on the device 250, the local repository 285 can be queried to determine if there is any locally stored response, and also determine whether the response is valid. When a valid response is available in the local cache 285, the response can be provided to the application on the device 250 without the device 250 needing to access the cellular network or wireless broadband network.

If a valid response is not available, the local proxy 175 can query a remote proxy (e.g., the server proxy 125 of FIGS. 4A-4C) to determine whether a remotely stored response is valid. If so, the remotely stored response (e.g., which may be stored on the server cache 135 or optional caching server 199 shown in the example of FIG. 1C) can be provided to the mobile device, possibly without the mobile device 250 needing to access the cellular network, thus relieving consumption of network resources.

Figure 4A:
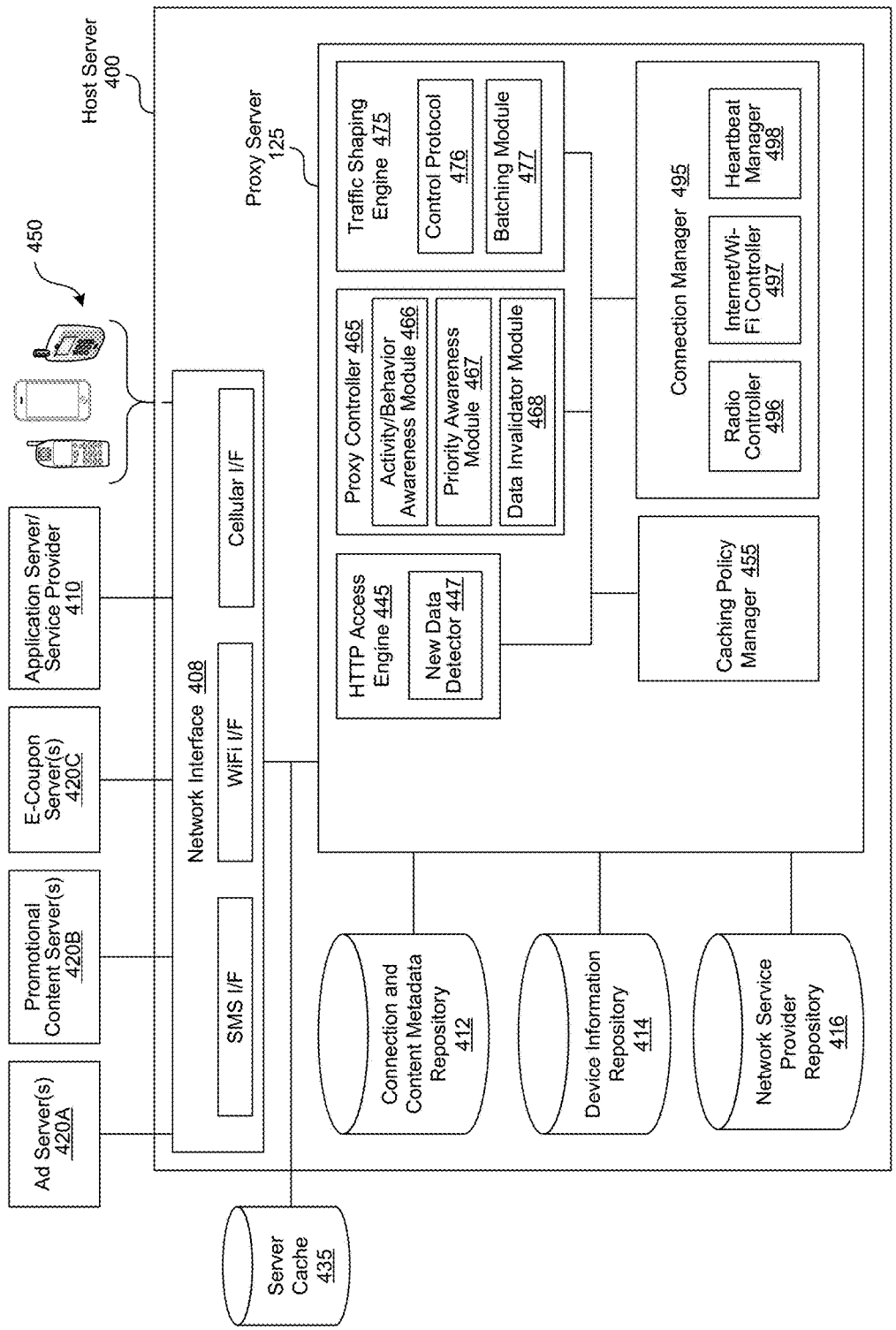
FIG. 4A depicts a block diagram illustrating an example of server-side components, in certain embodiments of a distributed proxy and cache system that manage traffic in a wireless network (or broadband network) for resource conservation, content caching, and/or traffic management. In some embodiments, the server-side proxy (or proxy server) can further categorize mobile traffic and/or deploy and/or implement policies such as traffic management and delivery policies based on device state, application behavior, content priority, user activity, and/or user expectations.
Figure 4B:
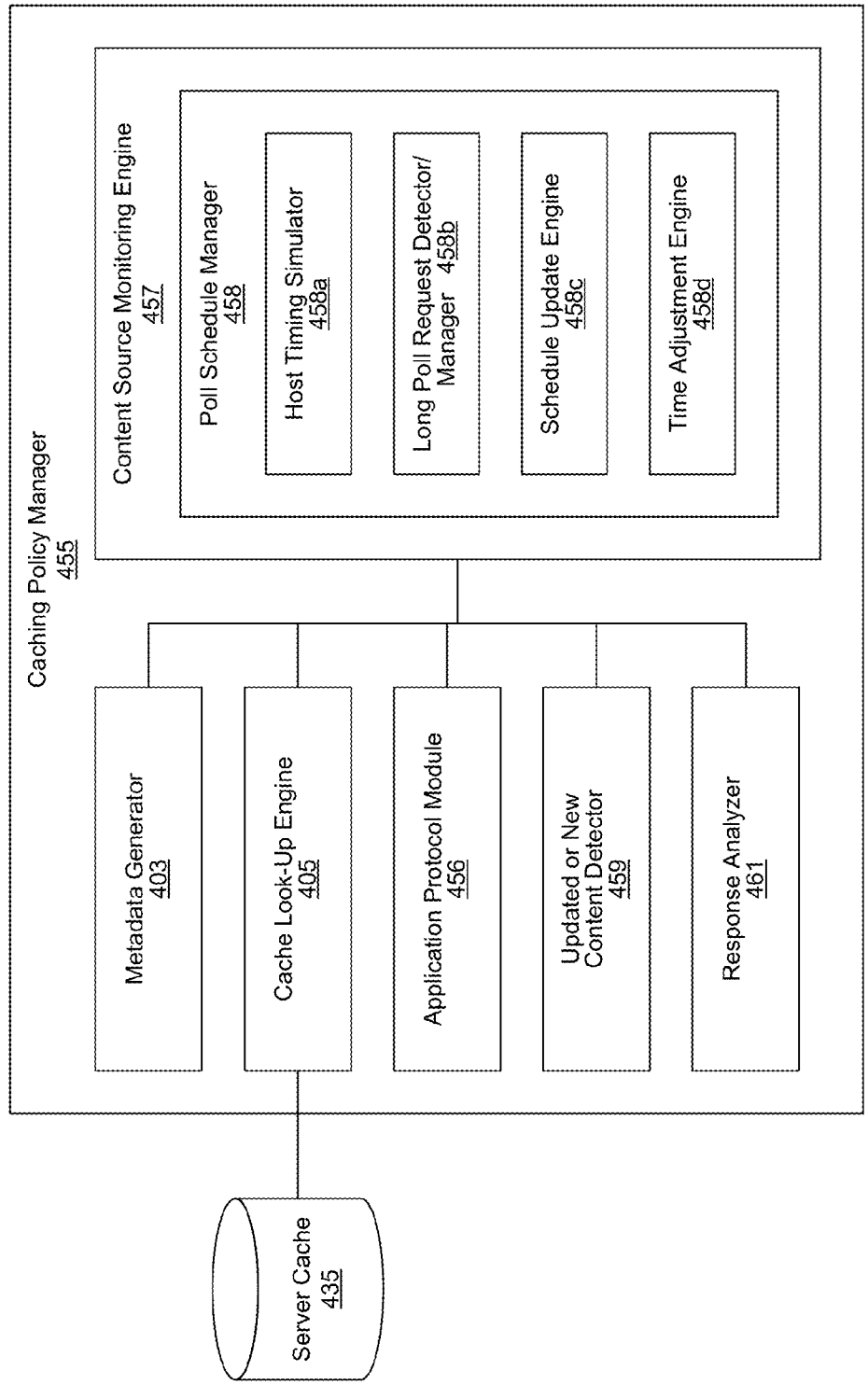
FIG. 4B depicts a block diagram illustrating a further example of components in a caching policy manager in the distributed proxy and cache system shown in the example of FIG. 4A which is capable of caching and adapting caching strategies for mobile application behavior and/or network conditions. Components capable in some embodiments of detecting long poll requests and managing caching of long polls are also illustrated.
Figure 4C:
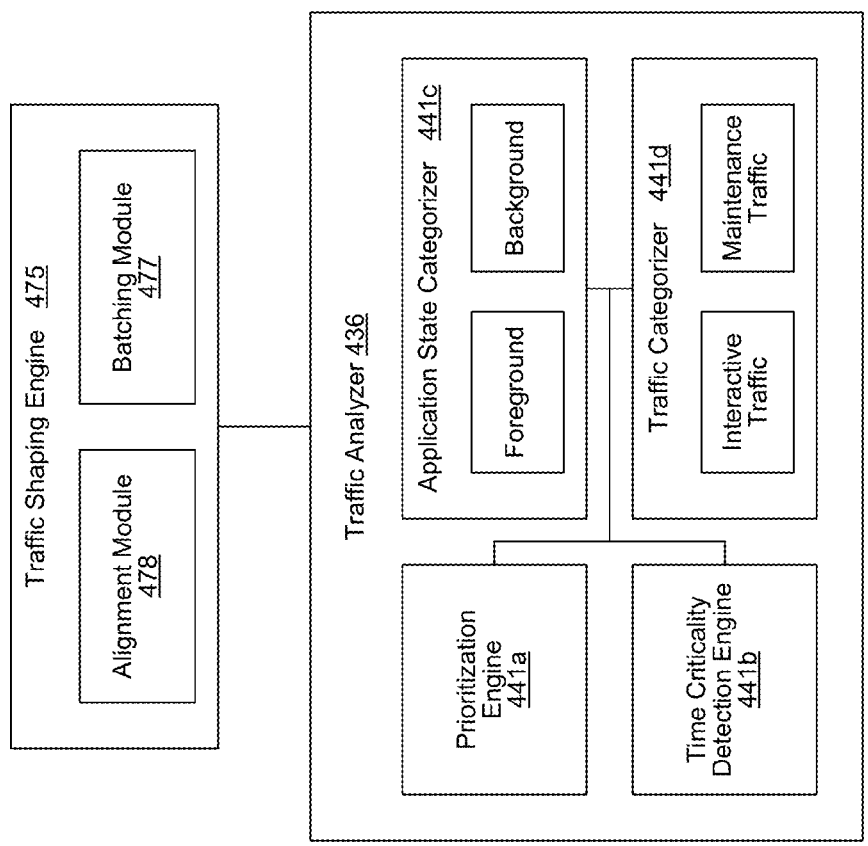
FIG. 4C depicts a block diagram illustrating examples of additional components in certain embodiments in a proxy server shown in the example of FIG. 4A, which is further capable of performing mobile traffic categorization and policy implementation based on application behavior and/or traffic priority to enhance mobile traffic management and resource conservation in a mobile network.

If a valid cache response is not available, or if cache responses are unavailable for the intercepted data request, the local proxy 175, for example, the caching policy manager 245 can send the data request to a remote proxy (e.g., server proxy 125 of FIGS. 4A-4C) which forwards the data request to a content source (e.g., application server/content provider 110 of FIG. 1B) and a response from the content source can be provided through the remote proxy, as will be further described in the description associated with the example host server 100 of FIGS. 4A-4C. The cache policy manager 245 can manage or process requests that use a variety of protocols, including but not limited to HTTP, HTTPS, IMAP, POP, SMTP, XMPP, and/or ActiveSync. The caching policy manager 245 can locally store responses for data requests in the local database 285 as cache entries for subsequent use in satisfying same or similar data requests.

The caching policy manager 245 can request that the remote proxy monitor responses for the data request and the remote proxy can notify the device 250 when an unexpected response to the data request is detected. In such an event, the cache policy manager 245 can erase or replace the locally stored response(s) on the device 250 when notified of the unexpected response (e.g., new data, changed data, additional data, etc.) to the data request. In one embodiment, the caching policy manager 245 is able to detect or identify the protocol used for a specific request, including but not limited to HTTP, HTTPS, IMAP, POP, SMTP, XMPP, and/or ActiveSync. In one embodiment, application specific handlers (e.g., via the application protocol module 246 of the caching policy manager 245) on the local proxy 175 allows for optimization of any protocol that can be port mapped to a handler in the distributed proxy (e.g., port mapped on the proxy server 125 in the example of FIGS. 4A-4C).

In one embodiment, the local proxy 175 notifies the remote proxy such that the remote proxy can monitor responses received for the data request from the content source for changed results prior to returning the result to the device 250, for example, when the data request to the content source has yielded the same results to be returned to the mobile device. In general, the local proxy 175 can simulate application server responses for applications on the device 250, using locally cached content. This can prevent utilization of the cellular network for transactions where new/changed data is not available, thus freeing up network resources and preventing network congestion.

In one embodiment, the local proxy 175 includes an application behavior detector 236 to track, detect, observe and/or monitor applications (e.g., proxy-aware and/or unaware applications 210 and 220) accessed or installed on the device 250. Application behaviors, or patterns in detected behaviors (e.g., via the pattern detector 237) of one or more applications accessed on the device 250 can be used by the local proxy 175 to optimize traffic in a wireless network needed to satisfy the data needs of these applications.

For example, based on detected behavior of multiple applications, the traffic shaping engine 255 can align content requests made by at least some of the applications over the network (wireless network) (e.g., via the alignment module 256). The alignment module 256 can delay or expedite some earlier received requests to achieve alignment. When requests are aligned, the traffic shaping engine 255 can utilize the connection manager to poll over the network to satisfy application data requests. Content requests for multiple applications can be aligned based on behavior patterns or rules/settings including, for example, content types requested by the multiple applications (audio, video, text, etc.), device (e.g., mobile or wireless device) parameters, and/or network parameters/traffic conditions, network service provider constraints/specifications, etc.

In one embodiment, the pattern detector 237 can detect recurrences in application requests made by the multiple applications, for example, by tracking patterns in application behavior. A tracked pattern can include, detecting that certain applications, as a background process, poll an application server regularly, at certain times of day, on certain days of the week, periodically in a predictable fashion, with a certain frequency, with a certain frequency in response to a certain type of event, in response to a certain type user query, frequency that requested content is the same, frequency with which a same request is made, interval between requests, applications making a request, or any combination of the above, for example.

Such recurrences can be used by traffic shaping engine 255 to offload polling of content from a content source (e.g., from an application server/content provider 110 of FIG. 1A) that would result from the application requests that would be performed at the mobile device or wireless device 250 to be performed instead, by a proxy server (e.g., proxy server 125 of FIG. 1C) remote from the device 250. Traffic shaping engine 255 can decide to offload the polling when the recurrences match a rule. For example, there are multiple occurrences or requests for the same resource that have exactly the same content, or returned value, or based on detection of repeatable time periods between requests and responses such as a resource that is requested at specific times during the day. The offloading of the polling can decrease the amount of bandwidth consumption needed by the mobile device 250 to establish a wireless (cellular or other wireless broadband) connection with the content source for repetitive content polls.

As a result of the offloading of the polling, locally cached content stored in the local cache 285 can be provided to satisfy data requests at the device 250 when content change is not detected in the polling of the content sources. As such, when data has not changed, application data needs can be satisfied without needing to enable radio use or occupying cellular bandwidth in a wireless network. When data has changed and/or new data has been received, the remote entity (e.g., the host server) to which polling is offloaded, can notify the device 250.

In one embodiment, the local proxy 175 can mitigate the need/use of periodic keep-alive messages (heartbeat messages) to maintain TCP/IP connections, which can consume significant amounts of power thus having detrimental impacts on mobile device battery life. The connection manager 265 in the local proxy (e.g., the heartbeat manager 267) can detect, identify, and intercept any or all heartbeat (keep-alive) messages being sent from applications.

The heartbeat manager 267 can prevent any or all of these heartbeat messages from being sent over the cellular, or other network, and instead rely on the server component of the distributed proxy system (e.g., shown in FIG. 1C) to generate and send the heartbeat messages to maintain a connection with the backend (e.g., application server/provider 110 in the example of FIG. 1B).

In some embodiments, the traffic management policy manager 249 can manage and implement traffic management policies such as traffic blocking policies, delaying policies, transmission policies, and/or the like. The policy manager 249 may trigger certain policies when certain conditions are met or certain events occur. For example, traffic blocking and delaying policies may be enforced on low priority traffic when a radio of the mobile device is idle. During a period of enforcement for a given policy, traffic that matches the policy rule set may be impacted (e.g., temporarily blocked, permanently blocked, delayed, or the like). When the enforcement period ends, a radio connection may be established (e.g., via the connection manager 265) and new connection requests may propagate across the network as usual. Any delayed or temporarily blocked traffic may be dispatched to their respective destinations in accordance with certain transmission policies, for example, which may come into effect when a predefined period of time expires or the radio of the mobile device comes up for other reasons (e.g., backlight turns on, user initiates a request, etc.).

In some embodiments, the radio state management engine 203 can perform the management and/or policy management of mobile device radio state promotion or demotion based on buffer, activity and/or device state monitoring. The radio state management engine 203 can determine what user activity and/or data activity should justify a radio state promotion and communicate the information to the network to be implemented as a single session, multi-session, or global policy (e.g., via a policy manager component on the network side proxy 114 of FIG. 3. This policy can be used to execute the appropriate level of throttling to prevent the radio from going to higher powered states when unjustified based on dynamic conditions (e.g., network status, traffic, congestion, user expectations, user behavior, other activity, and the like).

In some embodiments, the radio state change notification manager 202 can monitor or track a radio state of the mobile device 250 and notify the network-side proxy 114 when the radio state is promoted to active. The notification can, for example, trigger the network-side proxy 114 to initiate transfer of delayed traffic to the mobile device 250. In some other embodiments, the local proxy 175 may include a notification manager (not shown) that provides the network-side proxy 114 information on the mobile device state, user activity, application behavior, and the like. Such information may be utilized by the network-side proxy to intelligently manage incoming traffic at the network-side, and optimize signaling and conserve network and device resources.

The local proxy 175 generally represents any one or a portion of the functions described for the individual managers, modules, and/or engines. The local proxy 175 and device 250 can include additional or less components; more or less functions can be included, in whole or in part, without deviating from the novel art of the disclosure.

FIG. 2B illustrates a block diagram depicting additional components in a user activity module and an application behavior detector shown in the example of FIG. 2A.

One embodiment of the local proxy 175 includes the user activity module 215, which further includes one or more of, a user activity detector/tracker 215a, a user activity prediction engine 215b, and/or a user expectation manager 215c. The application behavior detector 236 can further include a prioritization engine 241a, a time criticality detection engine 241b, an application state categorizer 241c, and/or an application traffic categorizer 241d. The local proxy 175 can further include a backlight detector 219.

In one embodiment, the application behavior detector 236 may detect, determine, identify, or infer, the activity state of an application on the mobile device 250 from which traffic has originated or is directed to, for example, via the application state categorizer 241c and/or the application traffic categorizer 241d. The activity state can be determined based on whether the application is in a foreground or background state on the mobile device (via the application state categorizer 241c) since the traffic for a foreground application versus a background application may be handled differently.

In one embodiment, the activity state can be determined, detected, identified, or inferred with a level of certainty of heuristics, based on the backlight status of the mobile device 250 (e.g., by the backlight detector 219) or other software agents or hardware sensors on the mobile device, including but not limited to, resistive sensors, capacitive sensors, ambient light sensors, motion sensors, touch sensors, and the like. In general, if the backlight is on, the traffic can be treated as being or determined to be generated from an application that is active or in the foreground, or the traffic is interactive. In addition, if the backlight is on, the traffic can be treated as being or determined to be traffic from user interaction or user activity, or traffic containing data that the user is expecting within some time frame.

In one embodiment, the activity state is determined based on whether the traffic is interactive traffic or maintenance traffic. Interactive traffic can include transactions from responses and requests generated directly from user activity/interaction with an application and can include content or data that a user is waiting or expecting to receive. Maintenance traffic may be used to support the functionality of an application which is not directly detected by a user. Maintenance traffic can also include actions or transactions that may take place in response to a user action, but the user is not actively waiting for or expecting a response.

For example, a mail or message delete action at a mobile device 250 generates a request to delete the corresponding mail or message at the server, but the user typically is not waiting for a response. Thus, such a request may be categorized as maintenance traffic, or traffic having a lower priority (e.g., by the prioritization engine 241a) and/or is not time-critical (e.g., by the time criticality detection engine 214b).

Contrastingly, a mail 'read' or message 'read' request initiated by a user a the mobile device 250, can be categorized as 'interactive traffic' since the user generally is waiting to access content or data when they request to read a message or mail. Similarly, such a request can be categorized as having higher priority (e.g., by the prioritization engine 241a) and/or as being time critical/time sensitive (e.g., by the time criticality detection engine 241b).

The time criticality detection engine 241b can generally determine, identify, infer the time sensitivity of data contained in traffic sent from the mobile device 250 or to the mobile device from a host server (e.g., host 300) or application server (e.g., app server/content source 110). For example, time sensitive data can include, status updates, stock information updates, IM presence information, email messages or other messages, actions generated from mobile gaming applications, webpage requests, location updates, etc. Data that is not time sensitive or time critical, by nature of the content or request, can include requests to delete messages, mark-as-read or edited actions, application-specific actions such as an add-friend or delete-friend request, certain types of messages, or other information which does not frequently change by nature, etc. In some instances when the data is not time critical, the timing with which to allow the traffic to pass through is set based on when additional data needs to be sent from the mobile device 250. For example, traffic shaping engine 255 can align the traffic with one or more subsequent transactions to be sent together in a single power-on event of the mobile device radio (e.g., using the alignment module 256 and/or the batching module 257). The alignment module 256 can also align polling requests occurring close in time directed to the same host server, since these requests are likely to be responded to with the same data. In some instances, the timing for withholding or delaying traffic and timing for allowing any delayed or new traffic to the network can be based on traffic management policies.

In the alternate or in combination, the activity state can be determined from assessing, determining, evaluating, inferring, identifying user activity at the mobile device 250 (e.g., via the user activity module 215). For example, user activity can be directly detected and tracked using the user activity tracker 215a. The traffic resulting therefrom can then be categorized appropriately for subsequent processing to determine the policy for handling. Furthermore, user activity can be predicted or anticipated by the user activity prediction engine 215b. By predicting user activity or anticipating user activity, the traffic thus occurring after the prediction can be treated as resulting from user activity and categorized appropriately to determine the transmission policy.

In addition, the user activity module 215 can also manage user expectations (e.g., via the user expectation manager 215c and/or in conjunction with the activity tracker 215 and/or the prediction engine 215b) to ensure that traffic is categorized appropriately such that user expectations are generally met. For example, a user-initiated action should be analyzed (e.g., by the expectation manager 215) to determine or infer whether the user would be waiting for a response. If so, such traffic should be handled under a policy such that the user does not experience an unpleasant delay in receiving such a response or action.

In one embodiment, an advanced generation wireless standard network is selected for use in sending traffic between a mobile device and a host server in the wireless network based on the activity state of the application on the mobile device for which traffic is originated from or directed to. Advanced technology standards such as the 3G, 3.5G, 3G+, 4G, or LTE network can be selected for handling traffic generated as a result of user interaction, user activity, or traffic containing data that the user is expecting or waiting for. Advanced generation wireless standard network can also be selected for transmitting data contained in traffic directed to the mobile device which responds to foreground activities.

In categorizing traffic and defining a transmission policy for mobile traffic, a network configuration can be selected for use (e.g., by a network configuration selection engine) on the mobile device 250 in sending traffic between the mobile device and a proxy server and/or an application server (e.g., app server/host 110). The network configuration that is selected can be determined based on information gathered by the application behavior module 236 regarding application activity state (e.g., background or foreground traffic), application traffic category (e.g., interactive or maintenance traffic), any priorities of the data/content, time sensitivity/criticality.

Figure 3:
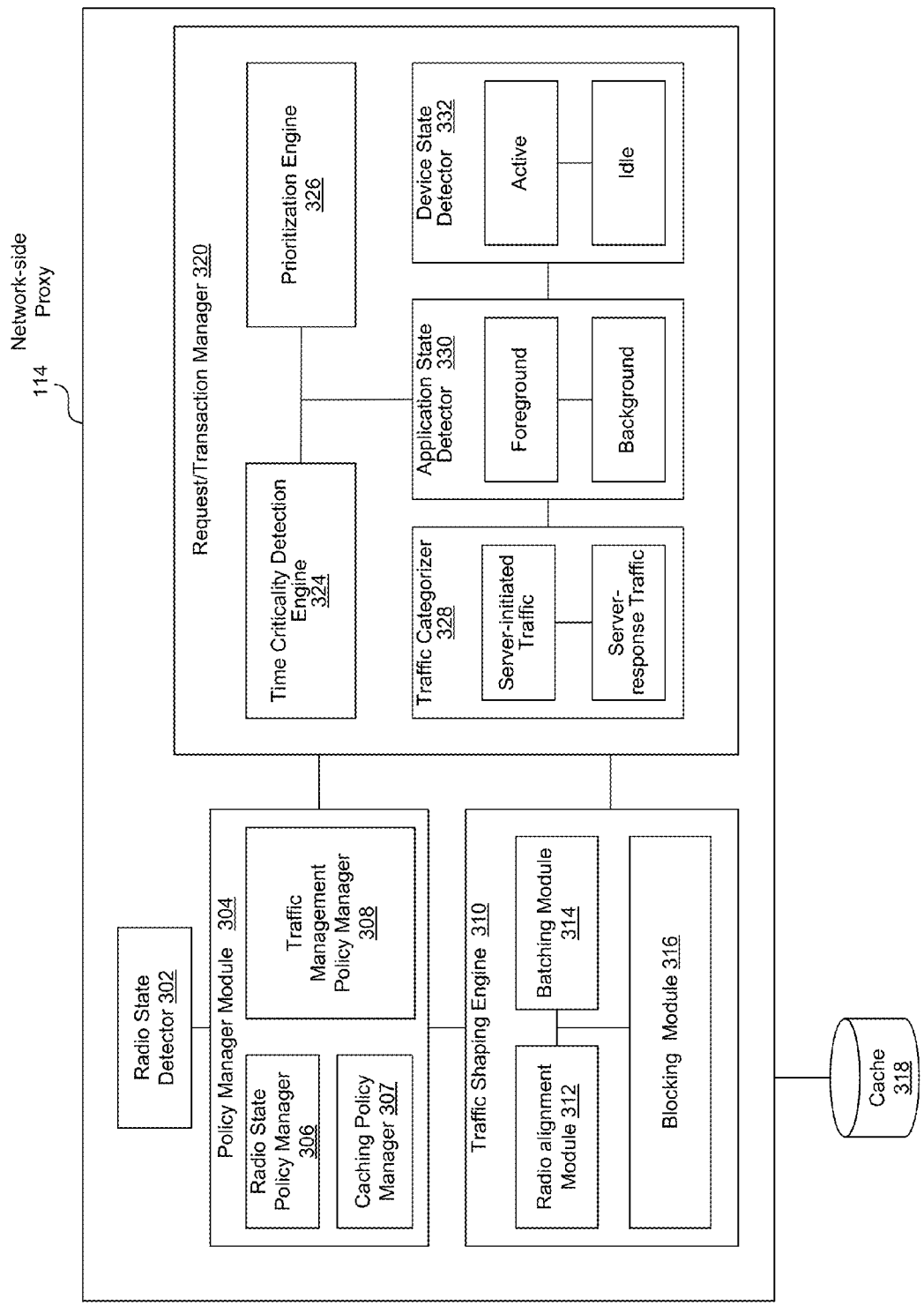
FIG. 3 illustrates a block diagram depicting an example of network-side components in a distributed proxy and cache system, including components for managing incoming traffic from third-party servers to enhance mobile traffic management and resource conservation in a mobile network.

FIG. 3 illustrates a block diagram depicting an example of network-side components in a distributed proxy and cache system, including components for managing incoming traffic from third-party servers to enhance mobile traffic management in a mobile network and conserve resources.

In some embodiments, the network-side proxy 114 includes a radio state detector 302, a policy manager module 304, a traffic shaping engine 310 and a request/transaction manager 320. The policy manager module 304 may further include a radio state policy manager 306, a caching policy manager 307 and a traffic management policy manager 308. The traffic shaping engine 310 may further include an alignment module 312, a batching module 314 and/or a blocking module 316. The request/transaction manager 320 may further include a time criticality detection engine 324, a prioritization engine 326, a traffic detector/categorizer 328, an application state detector 330 and a device state detector 332. More or less components may be present in the network-side proxy 114 and/or each illustrated component of the network-side proxy 114.

One embodiment of the network-side proxy 114 includes a radio state detector 302 which tracks, detects, determines, estimates or receives information concerning radio states of mobile devices that connect to an operator's mobile network where the network-side proxy 114 resides. In some embodiments, the radio state detector 302 can be aware of radio states of mobile devices, and determine whether a mobile device is idle or active at any given time based on the traffic from mobile devices tunneling through the network-side proxy 114. In embodiments where the network-side proxy 114 is integrated to the radio access network, the radio state detector 304 can be aware of the radio state of mobile devices based on information from the network. In other embodiments, the radio state detector 302 may obtain radio state information from the local proxy 175 and/or the proxy server 125 which can provide real time information on radio state promotions (e.g., transition from idle to active state) and demotions (e.g., transition from active to idle state). Receiving real time radio state information from the local proxy 175 and/or proxy server 125 could add bandwidth overhead. However, knowing the radio state information of a mobile device allows the network-side proxy 114 to manage incoming traffic in an efficient manner without having to cause the mobile device to turn on its radio every time data packets are received from third-party servers.

One embodiment of the network-side proxy 114 includes the request/transaction manager 320 which can detect, identify, intercept, process and/or manage incoming traffic initiated by third-party servers 110 as well as server responses (e.g., HTTP responses) to data requests from one or more applications on the mobile device 250. The request/transaction manager 320 can determine how and when to process a given request or transaction, or a set of requests or transactions based on one or more criteria that may include, for example, transaction characteristics, network settings (e.g., inactivity or dormancy timers), and the like. In some embodiments, the transaction characteristics may depend on whether the transaction (e.g., HTTP response from third-party server) was a result of user-interaction or other user initiated action on the mobile device (e.g., user interaction with a mobile application), or if the transaction was initiated by the server (e.g., server-initiated data push). Transaction characteristics can also depend on the amount of data that will be transferred or is anticipated to be transferred as a result of the request/requested transaction.

In some embodiments, the request/transaction manager 320 can prioritize requests or transactions made by third-party servers and/or third-party server responses to requests made by applications on the mobile device 250 via the prioritization engine 326, for example. Importance or priority of requests/transactions can be determined by the request/transaction manager by applying a rule set, for example, according to time sensitivity of the transaction, time sensitivity of the content in the transaction, time criticality of the transaction, time criticality of the data transmitted in the transaction, and/or time criticality or importance of an application to which the transmission is directed to. The time criticality of the transactions may be detected via the time criticality detection engine 324. In general, a time critical transaction can include a transaction that is responsive to a user-initiated request, and can be prioritized as such. In some implementations, a time critical transaction is one that includes information having an expiry date/time (e.g., stock prices, weather, etc.) or information pertaining to applications whose operations or functions may be impaired if such information is delayed or blocked.

In general, the priorities can be determined or set in default, for example, based on device platform, device manufacturer, operating system, etc. Priorities can alternatively or in additionally be set by the particular application/server. For example, the Facebook mobile application/server can set its own priorities for various transactions (e.g., a status update can be of higher priority than an add friend request or a poke request; a message can be of higher priority than a notification of tagging), an email application/server or IM chat application/server may have its own configurations for priority. The prioritization engine 326 may include set of rules for assigning priority.

The prioritization engine 326 can also track network provider limitations or specifications on application or transaction priority in determining an overall priority status for a request/transaction. Furthermore, priority can in part or in whole be determined by user preferences, either explicit or implicit. A user, can in general, set priorities at different tiers, such as specific priorities for sessions, or types, or applications (e.g., a browsing session, a gaming session, versus an IM chat session, the user may set a gaming session to always have higher priority than an IM chat session, which may have higher priority than web-browsing session). A user can set application-specific priorities, (e.g., a user may set Facebook related transactions to have a higher priority than LinkedIn related transactions), for specific transaction types (e.g., for all send message requests across all applications to have higher priority than message delete requests, for all calendar-related events to have a high priority, etc.), and/or for specific folders.

The prioritization engine 326 can track and resolve conflicts in priorities set by different entities. For example, manual settings specified by the user may take precedence over device OS settings, network provider parameters/limitations (e.g., set in default for a network service area, geographic locale, set for a specific time of day, or set based on service/fee type) may limit any user-specified settings and/or application-set priorities. In some instances, data response to a manual sync request received from a user can override some, most, or all priority settings in that the requested synchronization is performed when requested, regardless of the individually assigned priority or an overall priority ranking for the requested action.

In some embodiments, the traffic categorizer 328 can analyze traffic from third-party servers and categorize such traffic as server-initiated traffic or server-response traffic, for example. The traffic categorizer 328 can, via the prioritization engine 326 and/or time criticality detection engine 324, categorize traffic into priority-based categories (e.g., high, medium or low priority traffic). In some embodiments, the traffic categorizer 328 can further detect traffic from third-party servers relating to socket closures (e.g., FIN packets) or for checking if the client is still connected. Each categories of traffic may be handled in one or more ways by the network-side proxy 114 via the request/transaction manager 320, traffic shaping engine 310, and the like.

In some embodiments, the application state detector 330 detects the foreground or background state of applications on a mobile device 250 (e.g., using information reported by the local proxy 175 and/or the server proxy 125). Information concerning the state of the applications may be used by the network-side proxy 114 to determine traffic from which third-party server(s) should be prioritized for transfer, for example. The device state detector 332, in some embodiments, detects whether a mobile device is in active mode (e.g., back light is on or there is user interaction), or if the device is in an idle or passive mode (e.g., back light is off). Information relating to device state may be used in managing or shaping incoming traffic.

In some embodiments, the traffic shaping engine 310 may shape or manage server-initiated traffic and/or server response traffic. The traffic shaping engine 310 may utilize transaction characteristics, priority, time criticality, application state, radio state, traffic category, device state, and the like in shaping or managing traffic. For example, in one implementation, in response to determining that the radio state of a mobile device is idle, the traffic shaping engine 310 can delay low priority traffic from third-party servers at the network-side for a period of time, or until one or more conditions are met. For example, the network-side proxy 114 may continue to delay the low priority traffic until the radio state of the mobile device is promoted to a connected state.

One embodiment of the radio alignment module 312 of the traffic shaping engine 310 can align traffic from multiple third-party servers to optimize the number of radio turn on events and the amount of data that can be transferred to the mobile device in each radio event. In some instances, the optimization may not necessarily minimize the number of radio turn on events or maximize the amount of data that can be transferred per event since such optimization may also take into account other conditions or characteristics such as time criticality or urgency of some of the requests. For example, when an incoming request is time critical or high priority, the network-side proxy 114 can allow the radio on the mobile device to turn on so that the time critical or high priority incoming request can be transferred to the mobile device without delay.

The radio alignment module 312 can delay server initiated and/or server response traffic to achieve alignment with radio turn on events. When a radio turn on event is detected (e.g., via radio state detector 302), the traffic shaping engine 310 can allow the delayed requests and/or responses to be transferred to the mobile device. In addition, the traffic shaping engine 310 can allow multiple low priority transactions from third-party servers to accumulate for batch transferring to a mobile device 250 (e.g., via the batching module 314). The batching module 314 can initiate a batch transfer based on certain criteria. For example, a batch transfer of multiple occurrences of requests, some of which occurred at different instances in time, may occur after a certain number of low priority requests have been detected, after an amount of time elapses after the first of the low priority requests was initiated, or after an allocated buffer is filled. In addition, the batching module 314 can initiate a batch transfer of the accumulated low priority events when a higher priority event is received or detected at the network-side proxy 114. A batch transfer can otherwise be initiated when radio use is triggered at the mobile device for another reason (e.g., user interaction wakes up the mobile device). In some embodiments, the batching capability can be disabled or enabled at the transaction level, application level, or session level, based on any one or combination of the following: user configuration, device limitations/settings, manufacturer specification, network operator parameters/limitations, platform specific limitations/settings, device OS settings, etc.

The traffic shaping engine 310, in some embodiments, may also block some of the traffic from third-party servers that are determined to be unnecessary via the blocking module 316. For example, when existing TCP sockets on a mobile device side are closed and the radio is down, a third-party server's socket may timeout and attempt to terminate the connection by sending a FIN packet or testing whether the connection is still alive by generating and sending some data. The blocking module 316 may block such unnecessary data packets from being delivered to the local proxy 175 of the mobile device 250. In some embodiments, the network-side proxy 114 (via a caching policy manager 307) may use a safe response (e.g., from cache 318) to respond to the third party server to keep the server happy. In the example of the third-party server sending a FIN packet, the network-side proxy 114 via the caching policy manager 307 can respond with an ACK packet, which prevents the server TCP stack from making retry attempts, which usually incurs additional signaling.

One embodiment of the network-side proxy 114 includes a policy manager module 304, which can manage policies relating to radio states, caching and/or traffic management. In one embodiment, the radio state policy manager 306 may perform the functions of a Policy and Charging Rules Function (PCRF) node in managing radio states of mobile devices by throttling. The radio state policy manager 306 determines whether a mobile device is idle or active at any given time (e.g., via the radio state detector 302), and depending on this information, the radio state policy manager 306 can dictate whether components in the radio access network (e.g., eNodeB or Radio Network Controller (RNC)) implement policies that would, for example, allow or forbid a radio channel status upgrade into a higher powered state, or lower the radio channel status to a lower powered state in a more intelligent and resource efficient manner. In some embodiments, the radio state policy manager 306 can perform throttling and the local proxy 175 and/or the proxy server 125 can provide the information to the network regarding the level of throttling should occur to trigger radio state changes to higher powered or lower powered states. The PCRF, and details relating to promotion and demotion of radio states is described in detail in co-pending U.S. patent application Ser. No. 13/844,682 titled "Management of Mobile Device Radio State Promotion and Demotion," which is herein expressly incorporated by reference.

The caching policy manager 307, in one embodiment, leverages data stored in the cache 318 to respond to incoming traffic or server response traffic, and thus obviate the need to establish a connection to a mobile device. The request/transaction manager 320 can intercept a request from a third-party server, and determine if there is a cached response in cache 318 that can be used as a response to the third-party server request. For example, in the case of a socket closure on the server-side, the network-side proxy 114 can respond with FIN/ACK, and prevent the server from attempting retries.

The traffic management policy manager 308 may also manage policies for coordinating, scheduling or aligning incoming and outgoing traffic and transmission of such traffic to their respective destinations. In one implementation, the traffic management policy manager 308 may implement a policy whereby both the local proxy 175 and the network-side proxy 114 delay or gate all the traffic during the same time period. When a trigger (e.g., based on a timer) is detected, network-side proxy 114 can promote the radio state of the mobile device to connected, and transfer the incoming traffic to the mobile device. Similarly, the local proxy 175 on the mobile device can take advantage of the radio state promotion from the network-side to transfer the outgoing traffic to the respective third-party servers. In some implementations, the radio state can be promoted from the device side due to other reasons (e.g., user initiating a request, backlight turning on). When the network-side proxy 114 detects the radio state promotion, the network-side proxy 114 can batch and transfer all the delayed traffic to the mobile device. When the radio state is demoted, the network-side proxy 114 (or the local proxy 175) can restart the delay or gating timer to align the next set of incoming traffic.

FIG. 4A depicts a block diagram illustrating an example of server-side components, in certain embodiments of a distributed proxy and cache system residing on a host server 400 that manages traffic in a wireless network (or broadband network) for resource conservation, content caching, and/or traffic management. In some embodiments, the server-side proxy (or proxy server 125) can further categorize mobile traffic and/or deploy and/or implement policies such as traffic management and delivery policies based on device state, application behavior, content priority, user activity, and/or user expectations.

The host server 400 generally includes, for example, a network interface 408 and/or one or more repositories 412, 414, and 416. Note that server 400 may be any portable/mobile or non-portable device, server, cluster of computers and/or other types of processing units (e.g., any number of a machine shown in the example of FIG. 1B) able to receive or transmit signals to satisfy data requests over a network including any wired or wireless networks (e.g., WiFi, cellular, Bluetooth, etc.).

The network interface 408 can include networking module(s) or devices(s) that enable the server 400 to mediate data in a network with an entity that is external to the host server 400, through any known and/or convenient communications protocol supported by the host and the external entity. Specifically, the network interface 408 allows the server 400 to communicate with multiple devices including mobile phone devices 450 and/or one or more application servers/content providers 410.

The host server 400 can store information about connections (e.g., network characteristics, conditions, types of connections, etc.) with devices in the connection metadata repository 412. Additionally, any information about third party application or content providers can also be stored in the repository 412. The host server 400 can store information about devices (e.g., hardware capability, properties, device settings, device language, network capability, manufacturer, device model, OS, OS version, etc.) in the device information repository 414. Additionally, the host server 400 can store information about network providers and the various network service areas in the network service provider repository 416.

The communication enabled by network interface 408 allows for simultaneous connections (e.g., including cellular connections) with devices 450 and/or connections (e.g., including wired/wireless, HTTP, Internet connections, LAN, WiFi, etc.) with content servers/providers 410 to manage the traffic between devices 450 and content providers 410, for optimizing network resource utilization and/or to conserver power (battery) consumption on the serviced devices 450. The host server 400 can communicate with mobile devices 450 serviced by different network service providers and/or in the same/different network service areas. The host server 400 can operate and is compatible with devices 450 with varying types or levels of mobile capabilities, including by way of example but not limitation, 1G, 2G, 2G transitional (2.5G, 2.75G), 3G (IMT-2000), 3G transitional (3.5G, 3.75G, 3.9G), 4G (IMT-advanced), etc.

In general, the network interface 408 can include one or more of a network adaptor card, a wireless network interface card (e.g., SMS interface, WiFi interface, interfaces for various generations of mobile communication standards including but not limited to 1G, 2G, 3G, 3.5G, 4G type networks such as LTE, WiMAX, etc.), Bluetooth, WiFi, or any other network whether or not connected via a router, an access point, a wireless router, a switch, a multilayer switch, a protocol converter, a gateway, a bridge, a bridge router, a hub, a digital media receiver, and/or a repeater.

The host server 400 can further include server-side components of the distributed proxy and cache system which can include a proxy server 125 and a server cache 435. In some embodiments, the proxy server 125 can include an HTTP access engine 445, a caching policy manager 455, a proxy controller 465, a traffic shaping engine 375, a new data detector 447 and/or a connection manager 495.

The HTTP access engine 445 may further include a heartbeat manager 498; the proxy controller 465 may further include a data invalidator module 468; the traffic shaping engine 475 may further include a control protocol 476 and a batching module 477. Additional or less components/modules/engines can be included in the proxy server 125 and each illustrated component.

In the example of a device (e.g., mobile device 450) making an application or content request to an application server or content provider 410, the request may be intercepted and routed to the proxy server 125 which is coupled to the device 450 and the application server/content provider 410. Specifically, the proxy server is able to communicate with the local proxy (e.g., proxy 175 of the examples of FIG. 1C) of the mobile device 450, the local proxy forwards the data request to the proxy server 125 in some instances for further processing and, if needed, for transmission to the application server/content server 410 for a response to the data request.

In such a configuration, the host 400, or the proxy server 125 in the host server 400 can utilize intelligent information provided by the local proxy in adjusting its communication with the device in such a manner that optimizes use of network and device resources. For example, the proxy server 125 can identify characteristics of user activity on the device 450 to modify its communication frequency. The characteristics of user activity can be determined by, for example, the activity/behavior awareness module 466 in the proxy controller 465 via information collected by the local proxy on the device 450.

In some embodiments, communication frequency can be controlled by the connection manager 495 of the proxy server 125, for example, to adjust push frequency of content or updates to the device 450. For instance, push frequency can be decreased by the connection manager 495 when characteristics of the user activity indicate that the user is inactive. In some embodiments, when the characteristics of the user activity indicate that the user is subsequently active after a period of inactivity, the connection manager 495 can adjust the communication frequency with the device 450 to send data that was buffered as a result of decreased communication frequency to the device 450.

In addition, the proxy server 125 includes priority awareness of various requests, transactions, sessions, applications, and/or specific events. Such awareness can be determined by the local proxy on the device 450 and provided to the proxy server 125. The priority awareness module 467 of the proxy server 125 can generally assess the priority (e.g., including time-criticality, time-sensitivity, etc.) of various events or applications; additionally, the priority awareness module 467 can track priorities determined by local proxies of devices 450.

In some embodiments, through priority awareness, the connection manager 495 can further modify communication frequency (e.g., use or radio as controlled by the radio controller 496) of the server 400 with the devices 450. For example, the server 400 can notify the device 450, thus requesting use of the radio if it is not already in use when data or updates of an importance/priority level which meets a criteria becomes available to be sent.

In some embodiments, the proxy server 125 can detect multiple occurrences of events (e.g., transactions, content, data received from server/provider 410) and allow the events to accumulate for batch transfer to device 450. Batch transfer can be cumulated and transfer of events can be delayed based on priority awareness and/or user activity/application behavior awareness as tracked by modules 467 and/or 466. For example, batch transfer of multiple events (of a lower priority) to the device 450 can be initiated by the batching module 477 when an event of a higher priority (meeting a threshold or criteria) is detected at the server 400. In addition, batch transfer from the server 400 can be triggered when the server receives data from the device 450, indicating that the device radio is already in use and is thus on. In some embodiments, the proxy server 125 can order the each messages/packets in a batch for transmission based on event/transaction priority such that higher priority content can be sent first in case connection is lost or the battery dies, etc.

In some embodiments, the server 400 caches data (e.g., as managed by the caching policy manager 455) such that communication frequency over a network (e.g., cellular network) with the device 450 can be modified (e.g., decreased). The data can be cached, for example, in the server cache 435 for subsequent retrieval or batch sending to the device 450 to potentially decrease the need to turn on the device 450 radio. The server cache 435 can be partially or wholly internal to the host server 400, although in the example of FIG. 5A it is shown as being external to the host 400. In some instances, the server cache 435 may be the same as and/or integrated in part or in whole with another cache managed by another entity (e.g., the optional caching proxy server 199 shown in the example of FIG. 1C), such as being managed by an application server/content provider 410, a network service provider, or another third party.

In some embodiments, content caching is performed locally on the device 450 with the assistance of host server 400. For example, proxy server 125 in the host server 400 can query the application server/provider 410 with requests and monitor changes in responses. When changed or new responses are detected (e.g., by the new data detector 447), the proxy server 125 can notify the mobile device 450 such that the local proxy on the device 450 can make the decision to invalidate (e.g., indicated as out-dated) the relevant cache entries stored as any responses in its local cache. Alternatively, the data invalidator module 468 can automatically instruct the local proxy of the device 450 to invalidate certain cached data, based on received responses from the application server/provider 410. The cached data is marked as invalid, and can get replaced or deleted when new content is received from the content server 410.

Note that data change can be detected by the detector 447 in one or more ways. For example, the server/provider 410 can notify the host server 400 upon a change. The change can also be detected at the host server 400 in response to a direct poll of the source server/provider 410. In some instances, the proxy server 125 can in addition, pre-load the local cache on the device 450 with the new/updated data. This can be performed when the host server 400 detects that the radio on the mobile device is already in use, or when the server 400 has additional content/data to be sent to the device 450.

One or more the above mechanisms can be implemented simultaneously or adjusted/configured based on application (e.g., different policies for different servers/providers 410). In some instances, the source provider/server 410 may notify the host 400 for certain types of events (e.g., events meeting a priority threshold level). In addition, the provider/server 410 may be configured to notify the host 400 at specific time intervals, regardless of event priority.

In some embodiments, the proxy server 125 of the host 400 can monitor/track responses received for the data request from the content source for changed results prior to returning the result to the mobile device, such monitoring may be suitable when data request to the content source has yielded same results to be returned to the mobile device, thus preventing network/power consumption from being used when no new changes are made to a particular requested. The local proxy of the device 450 can instruct the proxy server 125 to perform such monitoring or the proxy server 125 can automatically initiate such a process upon receiving a certain number of the same responses (e.g., or a number of the same responses in a period of time) for a particular request.

In some embodiments, the server 400, through the activity/behavior awareness module 466, is able to identify or detect user activity at a device that is separate from the mobile device 450. For example, the module 466 may detect that a user's message inbox (e.g., email or types of inbox) is being accessed. This can indicate that the user is interacting with his/her application using a device other than the mobile device 450 and may not need frequent updates, if at all.

The server 400, in this instance, can thus decrease the frequency with which new or updated content is sent to the mobile device 450, or eliminate all communication for as long as the user is detected to be using another device for access. Such frequency decrease may be application specific (e.g., for the application with which the user is interacting with on another device), or it may be a general frequency decrease (e.g., since the user is detected to be interacting with one server or one application via another device, he/she could also use it to access other services.) to the mobile device 450.

In some embodiments, the host server 400 is able to poll content sources 410 on behalf of devices 450 to conserve power or battery consumption on devices 450. For example, certain applications on the mobile device 450 can poll its respective server 410 in a predictable recurring fashion. Such recurrence or other types of application behaviors can be tracked by the activity/behavior module 466 in the proxy controller 465. The host server 400 can thus poll content sources 410 for applications on the mobile device 450 that would otherwise be performed by the device 450 through a wireless (e.g., including cellular connectivity). The host server can poll the sources 410 for new or changed data by way of the HTTP access engine 445 to establish HTTP connection or by way of radio controller 496 to connect to the source 410 over the cellular network. When new or changed data is detected, the new data detector 447 can notify the device 450 that such data is available and/or provide the new/changed data to the device 450.

In some embodiments, the connection manager 495 determines that the mobile device 450 is unavailable (e.g., the radio is turned off) and utilizes SMS to transmit content to the device 450, for instance, via the SMSC shown in the example of FIG. 1C. SMS is used to transmit invalidation messages, batches of invalidation messages, or even content in the case where the content is small enough to fit into just a few (usually one or two) SMS messages. This avoids the need to access the radio channel to send overhead information. The host server 400 can use SMS for certain transactions or responses having a priority level above a threshold or otherwise meeting a criteria. The server 400 can also utilize SMS as an out-of-band trigger to maintain or wake-up an IP connection as an alternative to maintaining an always-on IP connection.

In some embodiments, the connection manager 495 in the proxy server 125 (e.g., the heartbeat manager 498) can generate and/or transmit heartbeat messages on behalf of connected devices 450 to maintain a backend connection with a provider 410 for applications running on devices 450.

For example, in the distributed proxy system, local cache on the device 450 can prevent any or all heartbeat messages needed to maintain TCP/IP connections required for applications from being sent over the cellular, or other, network and instead rely on the proxy server 125 on the host server 400 to generate and/or send the heartbeat messages to maintain a connection with the backend (e.g., application server/provider 110 in the example of FIG. 1B). The proxy server can generate the keep-alive (heartbeat) messages independent of the operations of the local proxy on the mobile device.

The repositories 412, 414, and/or 416 can additionally store software, descriptive data, images, system information, drivers, and/or any other data item utilized by other components of the host server 400 and/or any other servers for operation. The repositories may be managed by a database management system (DBMS), for example, which may be but is not limited to Oracle, DB2, Microsoft Access, Microsoft SQL Server, PostgreSQL, MySQL, FileMaker, etc.

The repositories can be implemented via object-oriented technology and/or via text files and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package.

FIG. 4B depicts a block diagram illustrating a further example of components in a caching policy manager 455 in the distributed proxy and cache system shown in the example of FIG. 4A which is capable of caching and adapting caching strategies for mobile application behavior and/or network conditions.

The caching policy manager 455, In some embodiments, can further include a metadata generator 403, a cache look-up engine 405, an application protocol module 456, a content source monitoring engine 457 having a poll schedule manager 458, a response analyzer 461, and/or an updated or new content detector 459. In some embodiments, the poll schedule manager 458 further includes a host timing simulator 458a, a long poll request detector/manager 458b, a schedule update engine 458c, and/or a time adjustment engine 458d. The metadata generator 403 and/or the cache look-up engine 405 can be coupled to the cache 435 (or, server cache) for modification or addition to cache entries or querying thereof.

In some embodiments, the proxy server (e.g., the proxy server 125 of the examples of FIGS. 1B-1C and FIG. 4A) can monitor a content source for new or changed data via the monitoring engine 457. The proxy server, as shown, is an entity external to the mobile device 250 of FIGS. 2A-2B. The content source (e.g., application server/content provider 110 of FIG. 1B-1C) can be one that has been identified to the proxy server (e.g., by the local proxy) as having content that is being locally cached on a mobile device (e.g., mobile device 150 or 250). The content source can be monitored, for example, by the monitoring engine 457 at a frequency that is based on polling frequency of the content source at the mobile device. The poll schedule can be generated, for example, by the local proxy and sent to the proxy server. The poll frequency can be tracked and/or managed by the poll schedule manager 458.

For example, the proxy server can poll the host (e.g., content provider/application server) on behalf of the mobile device and simulate the polling behavior of the client to the host via the host timing simulator 458a. The polling behavior can be simulated to include characteristics of a long poll request-response sequences experienced in a persistent connection with the host (e.g., by the long poll request detector/manager 458b). Note that once a polling interval/behavior is set, the local proxy 175 on the device-side and/or the proxy server 125 on the server-side can verify whether application and application server/content host behavior match or can be represented by this predicted pattern. In general, the local proxy and/or the proxy server can detect deviations and, when appropriate, re-evaluate and compute, determine, or estimate another polling interval.

In some embodiments, the caching policy manager 455 on the server-side of the distribute proxy can, in conjunction with or independent of the proxy server 175 on the mobile device, identify or detect long poll requests. For example, the caching policy manager 455 can determine a threshold value to be used in comparison with a response delay interval time in a request-response sequence for an application request to identify or detect long poll requests, possible long poll requests (e.g., requests for a persistent connection with a host with which the client communicates including, but not limited to, a long-held HTTP request, a persistent connection enabling COMET style push, request for HTTP streaming, etc.), or other requests which can otherwise be treated as a long poll request.

For example, the threshold value can be determined by the proxy 125 using response delay interval times for requests generated by clients/applications across mobile devices which may be serviced by multiple different cellular or wireless networks. Since the proxy 125 resides on host 400 is able to communicate with multiple mobile devices via multiple networks, the caching policy manager 455 has access to application/client information at a global level which can be used in setting threshold values to categorize and detect long polls.

By tracking response delay interval times across applications across devices over different or same networks, the caching policy manager 455 can set one or more threshold values to be used in comparison with response delay interval times for long poll detection. Threshold values set by the proxy server 125 can be static or dynamic, and can be associated with conditions and/or a time-to-live (an expiration time/date in relative or absolute terms).

In addition, the caching policy manager 455 of the proxy 125 can further determine the threshold value, in whole or in part, based on network delays of a given wireless network, networks serviced by a given carrier (service provider), or multiple wireless networks. The proxy 125 can also determine the threshold value for identification of long poll requests based on delays of one or more application server/content provider (e.g., 110) to which application (e.g., mobile application) or mobile client requests are directed.

The proxy server can detect new or changed data at a monitored content source and transmits a message to the mobile device notifying it of such a change such that the mobile device (or the local proxy on the mobile device) can take appropriate action (e.g., to invalidate the cache elements in the local cache). In some instances, the proxy server (e.g., the caching policy manager 455) upon detecting new or changed data can also store the new or changed data in its cache (e.g., the server cache 135 of the examples of FIG. 1C). The new/updated data stored in the server cache 435 can be used in some instances to satisfy content requests at the mobile device; for example, it can be used after the proxy server has notified the mobile device of the new/changed content and that the locally cached content has been invalidated.

The metadata generator 403 can generate metadata for responses cached for requests at the mobile device 250. The metadata generator 403 can generate metadata for cache entries stored in the server cache 435. Similarly, the cache look-up engine 405 can include the same or similar functions are those described for the cache look-up engine 205 shown in the example of FIG. 4B.

The response analyzer 461 can perform any or all of the functionalities related to analyzing responses received for requests generated at the mobile device 250 in the same or similar fashion to the response analyzer 246d of the local proxy shown in the example of FIG. 4B. Since the proxy server 125 is able to receive responses from the application server/content source 410 directed to the mobile device 250, the proxy server 125 (e.g., the response analyzer 461) can perform similar response analysis steps to determine cacheability, as described for the response analyzer of the local proxy. The responses can be analyzed in addition to or in lieu of the analysis that can be performed at the local proxy 175 on the mobile device 250.

Furthermore, the schedule update engine 458c can update the polling interval of a given application server/content host based on application request interval changes of the application at the mobile device 250 as described for the schedule update engine in the local proxy 175. The time adjustment engine 458d can set an initial time at which polls of the application server/content host is to begin to prevent the serving of out of date content once again before serving fresh content as described for the schedule update engine in the local proxy 175. Both the schedule updating and the time adjustment algorithms can be performed in conjunction with or in lieu of the similar processes performed at the local proxy 175 on the mobile device 250.

FIG. 4C depicts a block diagram illustrating examples of additional components in certain embodiments in a proxy server 125 shown in the example of FIG. 4A which is further capable of performing mobile traffic categorization and policy implementation based on application behavior and/or traffic priority to enhance mobile traffic management and resource conservation in a mobile network.

In some embodiments of the proxy server 125, the traffic shaping engine 475 is further coupled to a traffic analyzer 436 for categorizing mobile traffic for policy definition and implementation for mobile traffic and transactions directed to one or more mobile devices (e.g., mobile device 250 of FIGS. 2A-C) or to an application server/content host (e.g., 110 of FIGS. 1B-1C). In general, the proxy server 125 is remote from the mobile devices and remote from the host server, as shown in the examples of FIGS. 1B-1C. The proxy server 125 or the host server 400 can monitor the traffic for multiple mobile devices and is capable of categorizing traffic and devising traffic policies for different mobile devices.

In addition, the proxy server 125 or host server 400 can operate with multiple carriers or network operators and can implement carrier-specific policies relating to categorization of traffic and implementation of traffic policies for the various categories. For example, the traffic analyzer 436 of the proxy server 125 or host server 400 can include one or more of, a prioritization engine 441a, a time criticality detection engine 441b, an application state categorizer 441c, and/or an application traffic categorizer 441d.

Each of these engines or modules can track different criterion for what is considered priority, time critical, background/foreground, or interactive/maintenance based on different wireless carriers. Different criterion may also exist for different mobile device types (e.g., device model, manufacturer, operating system, etc.). In some instances, the user of the mobile devices can adjust the settings or criterion regarding traffic category and the proxy server 125 is able to track and implement these user adjusted/configured settings.

In some embodiments, the traffic analyzer 436 is able to detect, determined, identify, or infer, the activity state of an application on one or more mobile devices (e.g., mobile device 150 or 250) which traffic has originated from or is directed to, for example, via the application state categorizer 441c and/or the traffic categorizer 441d. The activity state can be determined based on whether the application is in a foreground or background state on one or more of the mobile devices (via the application state categorizer 441c) since the traffic for a foreground application vs. a background application may be handled differently to optimize network use.

In the alternate or in combination, the activity state of an application can be determined by the wirelessly connected mobile devices (e.g., via the application behavior detectors in the local proxies) and communicated to the proxy server 125. For example, the activity state can be determined, detected, identified, or inferred with a level of certainty of heuristics, based on the backlight status at mobile devices (e.g., by a backlight detector) or other software agents or hardware sensors on the mobile device, including but not limited to, resistive sensors, capacitive sensors, ambient light sensors, motion sensors, touch sensors, etc. In general, if the backlight is on, the traffic can be treated as being or determined to be generated from an application that is active or in the foreground, or the traffic is interactive. In addition, if the backlight is on, the traffic can be treated as being or determined to be traffic from user interaction or user activity, or traffic containing data that the user is expecting within some time frame.

The activity state can be determined from assessing, determining, evaluating, inferring, identifying user activity at the mobile device 250 (e.g., via the user activity module 215) and communicated to the proxy server 125. In some embodiments, the activity state is determined based on whether the traffic is interactive traffic or maintenance traffic. Interactive traffic can include transactions from responses and requests generated directly from user activity/ interaction with an application and can include content or data that a user is waiting or expecting to receive. Maintenance traffic may be used to support the functionality of an application which is not directly detected by a user. Maintenance traffic can also include actions or transactions that may take place in response to a user action, but the user is not actively waiting for or expecting a response.

The time criticality detection engine 441b can generally determine, identify, infer the time sensitivity of data contained in traffic sent from the mobile device 250 or to the mobile device from the host server 400 or proxy server 125, or the application server (e.g., app server/content source 110). For example, time sensitive data can include, status updates, stock information updates, IM presence information, email messages or other messages, actions generated from mobile gaming applications, webpage requests, location updates, etc.

Data that is not time sensitive or time critical, by nature of the content or request, can include requests to delete messages, mark-as-read or edited actions, application-specific actions such as an add-friend or delete-friend request, certain types of messages, or other information which does not frequently changing by nature, etc. In some instances when the data is not time critical, the timing with which to allow the traffic to be sent to a mobile device is based on when there is additional data that needs to the sent to the same mobile device. For example, traffic shaping engine 475 can align the traffic with one or more subsequent transactions to be sent together in a single power-on event of the mobile device radio (e.g., using the alignment module 478 and/or the batching module 477). The alignment module 478 can also align polling requests occurring close in time directed to the same host server, since these request are likely to be responded to with the same data.

In general, whether new or changed data is sent from a host server to a mobile device can be determined based on whether an application on the mobile device to which the new or changed data is relevant, is running in a foreground (e.g., by the application state categorizer 441c), or the priority or time criticality of the new or changed data. The proxy server 125 can send the new or changed data to the mobile device if the application is in the foreground on the mobile device, or if the application is in the foreground and in an active state interacting with a user on the mobile device, and/or whether a user is waiting for a response that would be provided in the new or changed data. The proxy server 125 (or traffic shaping engine 475) can send the new or changed data that is of a high priority or is time critical.

Similarly, the proxy server 125 (or the traffic shaping engine 475) can suppressing the sending of the new or changed data if the application is in the background on the mobile device. The proxy server 125 can also suppress the sending of the new or changed data if the user is not waiting for the response provided in the new or changed data; wherein the suppressing is performed by a proxy server coupled to the host server and able to wirelessly connect to the mobile device.

In general, if data, including new or change data is of a low priority or is not time critical, the proxy server can waiting to transfer the data until after a time period, or until there is additional data to be sent (e.g. via the alignment module 478 and/or the batching module 477).

Figure 5A:
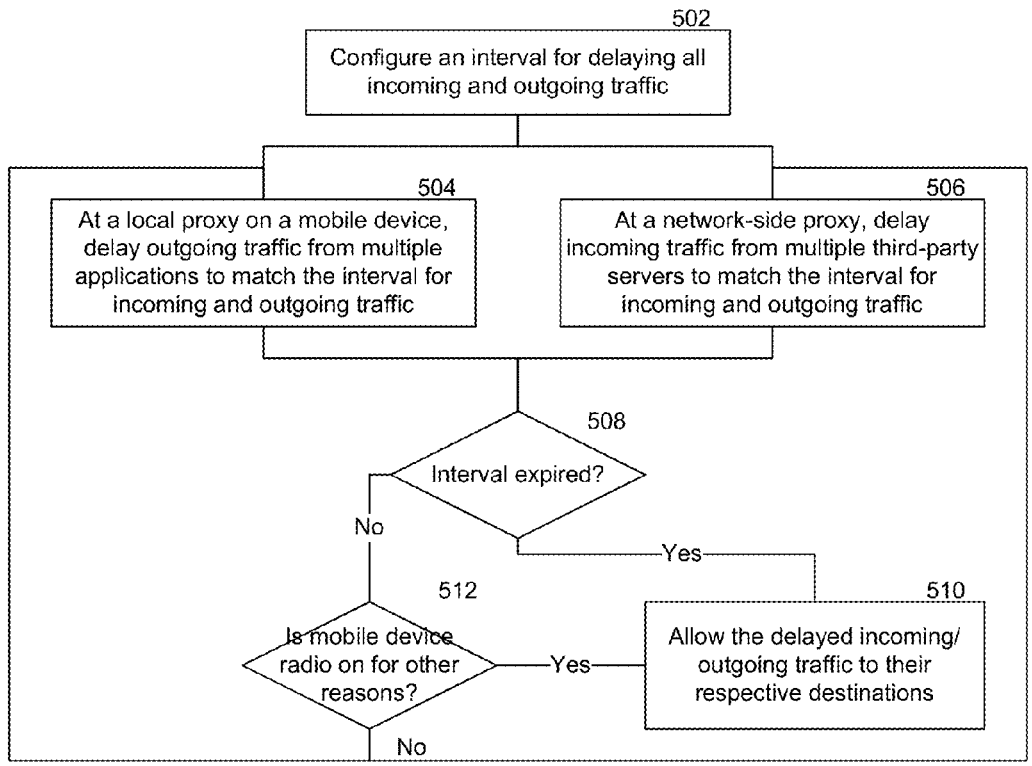
FIGS. 5A-C illustrate logic flow diagrams of example methods for enhancing mobile traffic management and resource conservation in a mobile network.

FIG. 5A illustrates a logic flow diagram of an example method for aligning incoming and outgoing traffic by delaying all traffic (incoming and outgoing) to match an interval that both the local proxy 175 and the network-side proxy 114 agree on. In the example method, at block 502, the local proxy 175 and/or the network-side proxy 114 configures an interval for delaying all incoming and outgoing traffic. In some implementations, the interval may be based on a policy that is enforced by the local proxy 175 and/or the network-side proxy 114. The policy can be distributed by the server-side proxy 125 or the operator of the mobile network. At block 504, the local proxy 175 on a mobile device delays all outgoing traffic from mobile applications to match the configured interval for incoming and outgoing traffic. At block 506, the network-side proxy 114, in the operator network, delays any or all incoming traffic from third-party servers directed towards the mobile device to match the configured interval for incoming and outgoing traffic. When the interval expires (e.g., as determined by a timer), as determined at block 508, the radio on the mobile device is promoted to an active state or an otherwise higher powered state. For example, the radio on the mobile device can be promoted from IDLE to CELL_DCH state, where CELL_DCH is a high power state with high throughput and power consumption. By way of another example, the radio on the mobile device can be promoted from CELL_FACH, a low power state with low throughput and power consumption to CELL_DCH state. The local proxy 175 then transfers the delayed outgoing traffic from the mobile device to respective third-party servers, while the network-side proxy 114 transfers the delayed incoming traffic from one or more third-party servers to the mobile device at block 510. Even if the interval is not expired but the mobile device radio is on for other reasons as determined at decision block 512, the incoming or outgoing traffic can be transferred to their respective destinations. When the interval has not expired, and when the radio state of the mobile device is in idle or otherwise in a low power state, the local proxy on the mobile device can continue to delay outgoing traffic at the mobile device at block 504, and the network-side proxy 114 can also continue to delay incoming traffic at the network-side proxy 114 at block 506.

Figure 5B:
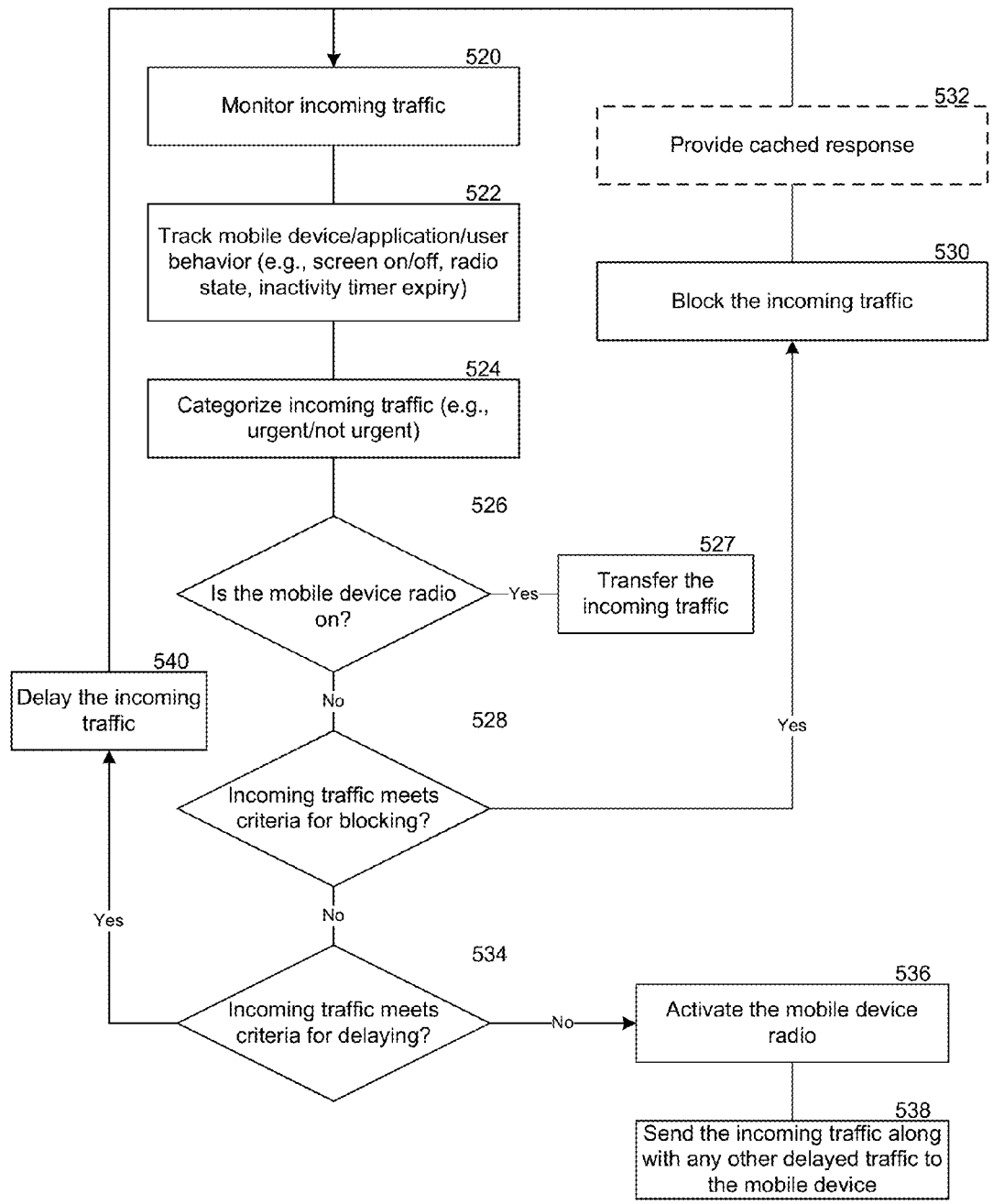

FIG. 5B illustrates a logic flow diagram of an example method for delaying and/or blocking incoming traffic. As illustrated, the network-side proxy 114 monitors incoming traffic from third-party servers at block 520 to determine whether the incoming traffic should be delayed, blocked or delivered to a mobile device. At block 522, the network-side proxy 114 tracks or monitors mobile device state, application state and/or user behavior. For example, the network-side proxy 114 can track the mobile device state (e.g., idle or connected), backlight status (on or off), and the like. The network-side proxy 114 can also determine the application state (e.g., foreground or background), application use information (e.g., how frequently or recently an application is used), and the like. The network-side proxy 114 can further determine user behavior information such as the whether the user is interacting with an application, behavioral patterns (e.g., frequency and/or timing of user interaction with the mobile device and/or application), and the like. By way of another example, the network-side proxy 114 can also be aware of traffic received from third-party servers in response to data requests from the mobile device after the inactivity timer has expired.

At block 524, the network-side proxy 114 categorizes the incoming traffic according to urgency or time criticality, priority, and the like. The network-side proxy 114 can also determine whether the incoming traffic is unnecessary. In one embodiment, data relating to socket closures or data relating to testing of a connection, acknowledgments, and the like can be considered unnecessary when a radio on the mobile device is in idle state or in some cases, regardless of the radio state. Unnecessary data can include any date that can be safely blocked without adverse consequences, including impact on user experience or functionality of mobile applications and/or the mobile device. For example, if a third-party server sends a FIN packet to terminate a TCP connection when a radio on the mobile device is idle, the FIN packet can be categorized as unnecessary data, since it can be safely blocked without adverse consequences. Further, such blocking of unnecessary data eliminates the need to power on the radio on the mobile device and reduces signaling in the mobile network.

In an embodiment, the network-side proxy 114 can use mobile device, application and/or user behavior to categorize the incoming traffic, and refrain from transferring some of the incoming traffic to the mobile device, even if the radio on the mobile device is on. By way of an example, if the mobile device's radio is on or is in a certain state, and there is interactive traffic associated with a bandwidth heavy application (e.g., YouTube, Skype), the incoming traffic having lower priority may be delayed to prioritize the incoming interactive traffic associated with the application on the foreground of the mobile device.

At decision block 526, the network-side proxy 114 determines whether the mobile device's radio is on, and if so, the network-side proxy 114 transfers the incoming traffic from one or more third-party servers to the mobile device at block 527. If the radio on the mobile device is down, at decision block 528, the network-side proxy 114 determines whether the incoming traffic from one or more third-party servers meets one or more criteria for blocking. Such blocking criteria may include, for example, availability of cached response, whether the incoming traffic is unnecessary, and the like. The criteria for blocking may be specified by traffic management policies, in an embodiment. For example, if the network-side proxy 114 determines that the incoming traffic from a third-party server is unnecessary, the network-side proxy 114 blocks the unnecessary incoming traffic at block 530. Similarly, if the network-side proxy 114 determines that a request in the incoming traffic can be responded to using a cached response, the network-side proxy 114 blocks the incoming traffic at block 530, and provides the cached response to the server that initiated the request at block 532. Alternately, if the incoming traffic does not meet the one or more criteria for blocking, the network-side proxy determines whether the incoming traffic meets one or more criteria for delaying at decision block 534. The delaying criteria may be based on category of the incoming traffic including priority or urgency, time criticality, or criticality relating to the functioning of an application and/or the mobile device, and the like. Such delaying criteria may be established by the traffic management policies, for example.

If the incoming traffic meets the criteria for delaying (e.g., incoming traffic is low priority traffic as described in reference to the prioritization engine 326, the time criticality detection engine 324 or the traffic categorizer 328), the incoming traffic is delayed at block 540, and the network-side proxy 114 continues to monitor the incoming traffic at block 520. Alternately, if the incoming traffic does not meet the criteria for delaying (e.g., the incoming traffic is time critical), then the network-side proxy may initiate or trigger paging of the mobile device to activate the radio on the mobile device at block 536. At block 538, the network-side proxy 114 can transfer the incoming traffic and any other delayed traffic to the mobile device over the established radio connection.

Figure 5C:
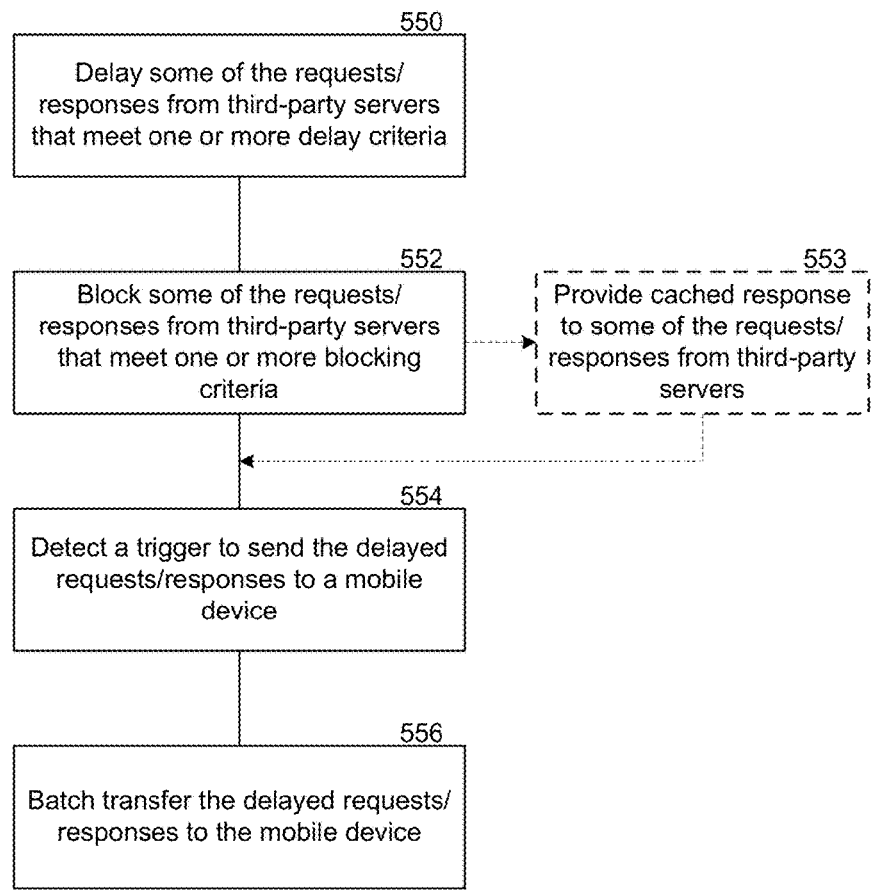

FIG. 5C illustrates a logic flow diagram of an example method for batch transferring delayed requests/responses from the network-side proxy 114 to a mobile device 250. At block 550, the network-side proxy 114 delays requests and/or responses from third-party servers that meet one or more delay criteria, which can include device state, application state, user behavior, time of day, day of the week, application type, category of the requests and/or responses, network settings (e.g., inactivity timer expiry), and the like. In some embodiments, the delay criteria can be specified by traffic management policies. At block 552, the network-side proxy 114 can block some of the requests and/or responses from the third-party servers that meet one or more blocking criteria. At block 553, the network-side proxy 114 can provide cached responses to some of the requests from the third-party servers. At block 554, the network-side proxy 114 detects a trigger to send the delayed requests/responses to a mobile device. The trigger can include, for example, a change in the radio state of the mobile device (e.g., radio state promotion to active or high power state), screen of the mobile device turning on, detecting of user interaction, receiving of a request/response having high priority, size of the aggregated delayed requests, and the like. At block 556, the network-side proxy 114 initiates a batch transfer of the delayed requests and/or responses to the mobile device. In some embodiments, the network-side proxy can signal the mobile device to turn on the radio or up the power of the radio to allow batch transfer of some or all of the delayed requests and/or responses from the network-side proxy 114 to the mobile device.

FIG. 6 depicts a table 600 showing examples of different traffic or application category types which can be used enhancing mobile traffic management. For example, traffic/application categories can include interactive or background, whether a user is waiting for the response, foreground/background application, and whether the backlight is on or off.

FIG. 7 depicts a table 700 showing examples of different content category types which can be used for enhancing mobile traffic management. For example, content category types can include content of high or low priority, and time critical or non-time critical content/data.

Figure 8:
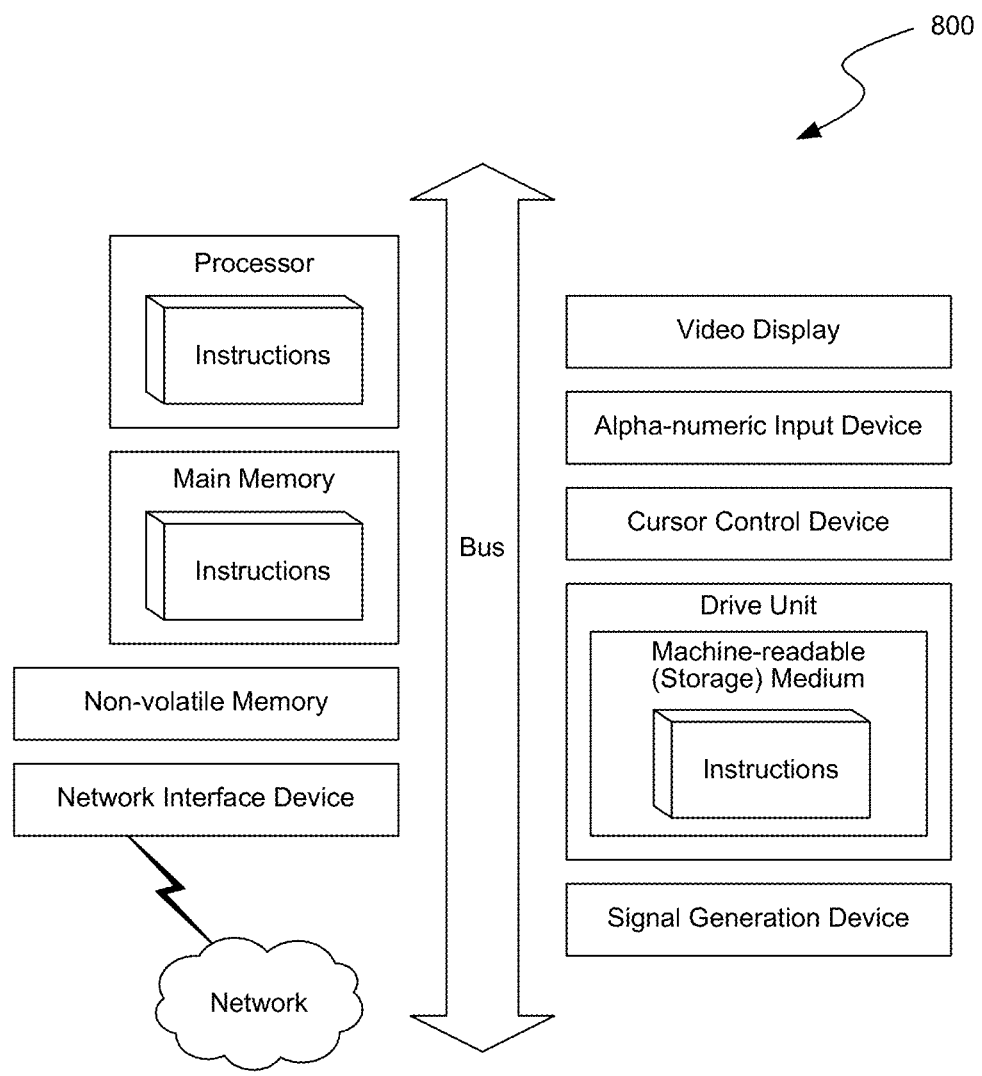
FIG. 8 shows a diagrammatic representation of a machine in the example form of a computer system within which a set of instructions, for causing the machine to perform any one or more of the methodologies discussed herein, may be executed.

FIG. 8 shows a diagrammatic representation of a machine in the example form of a computer system within which a set of instructions, for causing the machine to perform any one or more of the methodologies discussed herein, may be executed.

In the example of FIG. 8, the computer system 800 includes a processor, memory, non-volatile memory, and an interface device. Various common components (e.g., cache memory) are omitted for illustrative simplicity. The computer system 800 is intended to illustrate a hardware device on which any of the components depicted in the example of FIGS. 2A-2B, 3 and 4A-4C (and any other components described in this specification) can be implemented. The computer system 800 can be of any applicable known or convenient type. The components of the computer system 800 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 800. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 8 reside in the interface.

In operation, the computer system 800 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways.

Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

The invention claimed is:

1. A system for aligning requests in a mobile network to enhance mobile traffic management, comprising:
  a proxy server associated with a mobile operator, and configured to:
    intercept and accumulate requests initiated and routed by third party servers to a mobile device;
    send a response corresponding to at least one intercepted request to at least the particular third party server that initiated the at least one intercepted request to prevent the particular third party server from retrying the at least one intercepted request;
    align the intercepted and accumulated requests initiated by third-party servers with a radio state of a mobile device to reduce a number of network connections, wherein the requests are aligned by delaying the requests;
    detect promotion of a radio on the mobile device to a connected state or a high power state on the mobile device by receiving data from the mobile device; and
    transfer the requests that were delayed to the mobile device over a single connection between the mobile device and the mobile network upon detecting promotion of the radio to the connected state or the high power state.

2. The system of claim 1, wherein traffic management policies determine how long the requests are delayed.

3. The system of claim 2, wherein the traffic management policies include an operator policy and a mobile device policy, and wherein a proxy server residing on a host server distributes the mobile device policy to the mobile device and the operator policy to a component associated with the mobile operator for enforcement.

4. The system of claim 1, wherein the proxy server associated with the mobile operator transfers the requests that were delayed to the mobile device during a period of time when the radio state of the mobile device is connected, wherein the radio state of the mobile device is promoted to connected from idle in response to an activity on the mobile device.

5. The system of claim 1, wherein the proxy server associated with the mobile operator transfers the requests that were delayed to the mobile device during a period of time when the radio state of the mobile device is connected, wherein the radio state of the mobile device is promoted to connected from idle in response to the proxy server associated with the mobile operator intercepting a high priority request from a third-party server.

6. The system of claim 1, wherein the requests initiated by the third-party servers are asynchronously initiated by the third-party servers.

7. The system of claim 1, wherein the proxy server associated with the mobile operator is configured to determine an interval for delaying the requests.

8. The system of claim 7, wherein a local proxy on the mobile device delays outgoing traffic to the proxy server during the interval.

9. The system of claim 8, wherein, when the interval has not expired, the requests are transferred upon detecting promotion of the radio to the connected state or the high power state.

10. The system of claim 1, wherein the proxy server associated with the mobile operator is configured to allow data traffic to go to the mobile device in determined time intervals, and intercept and accumulate the requests initiated and routed by the third-party servers to the mobile device at times not within the determined time intervals.

11. The system of claim 10, wherein the proxy server associated with the mobile operator is configured to transfer the requests that were delayed to the mobile device over the single connection between the mobile device and the mobile network upon detecting promotion of the radio to the connected state or the high power state whether or not said detecting occurs within the determined time intervals.

12. The system of claim 1, wherein the proxy server associated with the mobile operator is configured to detect promotion of the radio on the mobile device to a connected state or a high power state on the mobile device by receiving data from the mobile device via a one way radio-aware control channel between a local proxy on the mobile device and the proxy server associated with the mobile operator.

13. The system of claim 1, wherein the proxy server associated with the mobile operator is configured to transfer the requests that were delayed to the mobile device in an order in which requests determined as having a higher priority ranking are transferred before requests determined as having a lower priority ranking.

14. The system of claim 13, wherein the priority rankings of requests are determined by preferences of a user of the mobile device.

15. The system of claim 13, wherein the priority rankings of requests are determined according to application-specific priorities of applications on the mobile device to which the requests are respectively directed.

* * * * *